(12) United States Patent
Ma et al.

(10) Patent No.: US 12,736,820 B2
(45) Date of Patent: Sep. 15, 2026

(54) REFLECTIVE LCD BASED VIRTUAL REALITY SYSTEM

(71) Applicant: Meta Platforms Technologies, LLC, Menlo Park, CA (US)

(72) Inventors: Ruiqing Ma, Kirkland, WA (US); Ajit Ninan, San Jose, CA (US); Sascha Hallstein, Saratoga, CA (US); Rungrot Kitsomboonloha, Los Gatos, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 210 days.

(21) Appl. No.: 18/608,884

(22) Filed: Mar. 18, 2024

(65) Prior Publication Data

US 2024/0329402 A1 Oct. 3, 2024

Related U.S. Application Data

(60) Provisional application No. 63/455,478, filed on Mar. 29, 2023.

(51) Int. Cl.
*G02B 27/01* (2006.01)
*G02F 1/1335* (2006.01)

(52) U.S. Cl.
CPC ... *G02B 27/0172* (2013.01); *G02F 1/133553* (2013.01); *G02B 2027/0178* (2013.01); *G02F 1/133514* (2013.01); *G02F 1/133528* (2013.01); *G02F 2203/01* (2013.01)

(58) Field of Classification Search
CPC ........ G02B 27/0172; G02B 2027/0178; G02F 1/133553; G02F 1/133514; G02F 1/133528; G02F 2203/01
See application file for complete search history.

(56) References Cited

U.S. PATENT DOCUMENTS 5,995,071 A * 11/1999 Mertz .................. G02B 27/017 359/267
2010/0066926 A1 3/2010 Tanijiri

FOREIGN PATENT DOCUMENTS

WO WO-2014209244 A1 12/2014
WO WO-2017164827 A1 9/2017

OTHER PUBLICATIONS

European Search Report for European Patent Application No. 24165951.5, dated Aug. 18, 2024, 5 pages.
European Search Report for European Patent Application No. 25166316.7, dated Jul. 11, 2025, 6 pages.

* cited by examiner

*Primary Examiner* — Anne M Hines
(74) *Attorney, Agent, or Firm* — Greenberg Traurig, LLP

(57) ABSTRACT

A near-eye display comprises a reflective liquid crystal display (LCD) panel configured to generate a display image, display optics configure to project the display image to a user, and one or more light sources positioned on a same side of the reflective LCD panel as the display optics and configured to illuminate the reflective LCD panel to generate the display image.

20 Claims, 14 Drawing Sheets

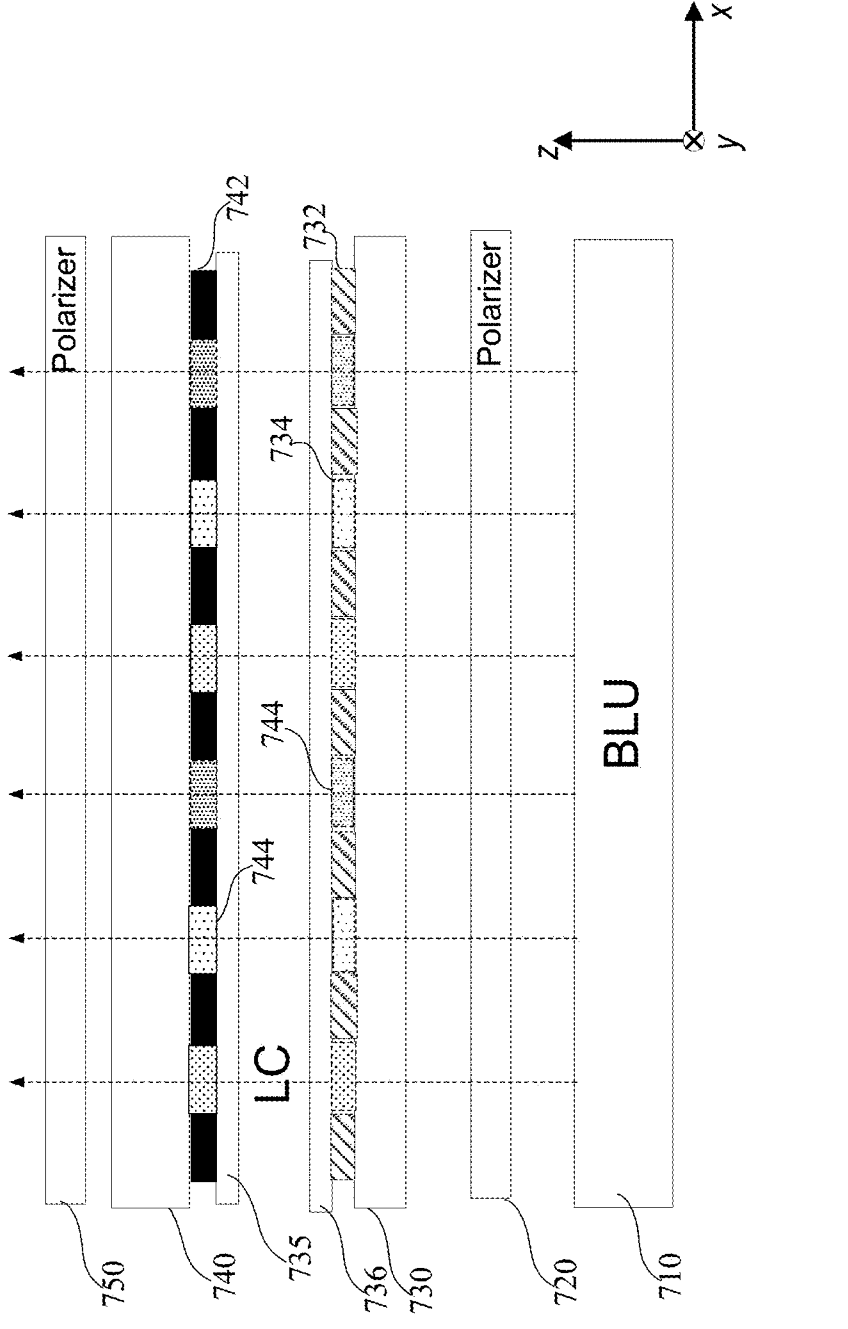
FIG. 7
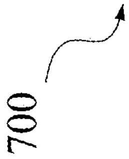

1000
1070
1060
1050
1040
1030
1020
1010
z
x
y 1002
1072
1072
1062
1052
1042
1032
1022
1012

REFLECTIVE LCD BASED VIRTUAL REALITY SYSTEM

CROSS-REFERENCE TO RELATED APPLICATIONS

This application claims the benefit of and priority to U.S. Provisional Application No. 63/455,478, filed Mar. 29, 2023, entitled "REFLECTIVE LCD BASED VIRTUAL REALITY SYSTEM," which is hereby incorporated by reference in its entirety for all purposes.

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. A near-eye display generally includes an optical system configured to form an image of a computer-generated image on an image plane. The optical system of the near-eye display may relay the image generated by an image source (e.g., a display panel) to create a virtual image that appears to be away from the image source and further than just a few centimeters away from the user's eyes.

SUMMARY

This disclosure relates generally to liquid crystal display (LCD). More specifically, and without limitation, techniques disclosed herein relate to reflective LCD panel-based near-eye display systems. Various inventive embodiments are described herein, including devices, systems, methods, structures, materials, processes, and the like.

According to certain embodiments, a near-eye display system may include a reflective liquid crystal display (LCD) panel configured to generate a display image, display optics configure to project the display image to a user, and one or more light sources positioned on a same side of the reflective LCD panel as the display optics and configured to illuminate the reflective LCD panel to generate the display image.

In some embodiments of the near-eye display system, the reflective LCD panel may include a first substrate, pixel drive circuits formed on the first substrate, one or more reflectors on the pixel drive circuits, a second substrate transparent to visible light, and a liquid crystal material layer between the second substrate and the one or more reflector. The one or more reflectors may be configured to reflect incident light from the one or more light sources towards the display optics at angles within an acceptance cone of the display optics of the near-eye display system. The one or more reflectors may include, for example, specular metal reflectors, diffractive reflectors, or meta-structures. In some embodiments, the specular metal reflectors may be used as pixel electrodes of pixels of the reflective LCD panel. In some embodiments, the one or more reflectors may include a plurality of reflectors having different tilt angles with respect to the first substrate, where the plurality of reflectors may be configured to reflect incident light from the one or more light sources towards the display optics at angles aligned with chief ray angles of pixels of the reflective LCD panel. In some embodiments, the reflective LCD panel may further include a planarization layer on the one or more reflectors. In some embodiments, the first substrate and the second substrate may be curved. In some embodiments, the one or more reflectors may form a concave-shaped reflective surface configured to collimate or concentrate incident light. In some embodiments, the pixel drive circuits may include thin-film transistors. In some embodiments, the first substrate may include a semiconductor substrate, and the pixel drive circuits may include complementary metal-oxide-semiconductor (CMOS) circuits.

In some embodiments of the near-eye display system, the one or more light sources may be positioned at peripheral regions of the near-eye display system to illuminate the reflective LCD panel at oblique angles such that light reflected by a front surface of the reflective LCD panel is not collected and projected to the user by the display optics. In some embodiments, the one or more light sources include a plurality of light sources configured to be switched on or off to generate a light pattern for illuminating the reflective LCD panel. In some embodiments, the near-eye display system may include a light pattern generator between the one or more light sources and the reflective LCD panel, the light pattern generator configured to convert light from the one or more light sources into a light pattern for illuminating the reflective LCD panel. In some embodiments, the near-eye display system may include a virtual reality headset. In some embodiments, the reflective LCD panel may be characterized by a resolution of about 1700 or more pixels per inch, such as greater than about 2000 pixels per inch. In some embodiments, a ratio between an active pixel area and a total pixel area of each pixel of pixels of the reflective LCD panel may be greater than about 80%.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 7 illustrates an example of a layer stack of an LCD panel.

Figure 1:
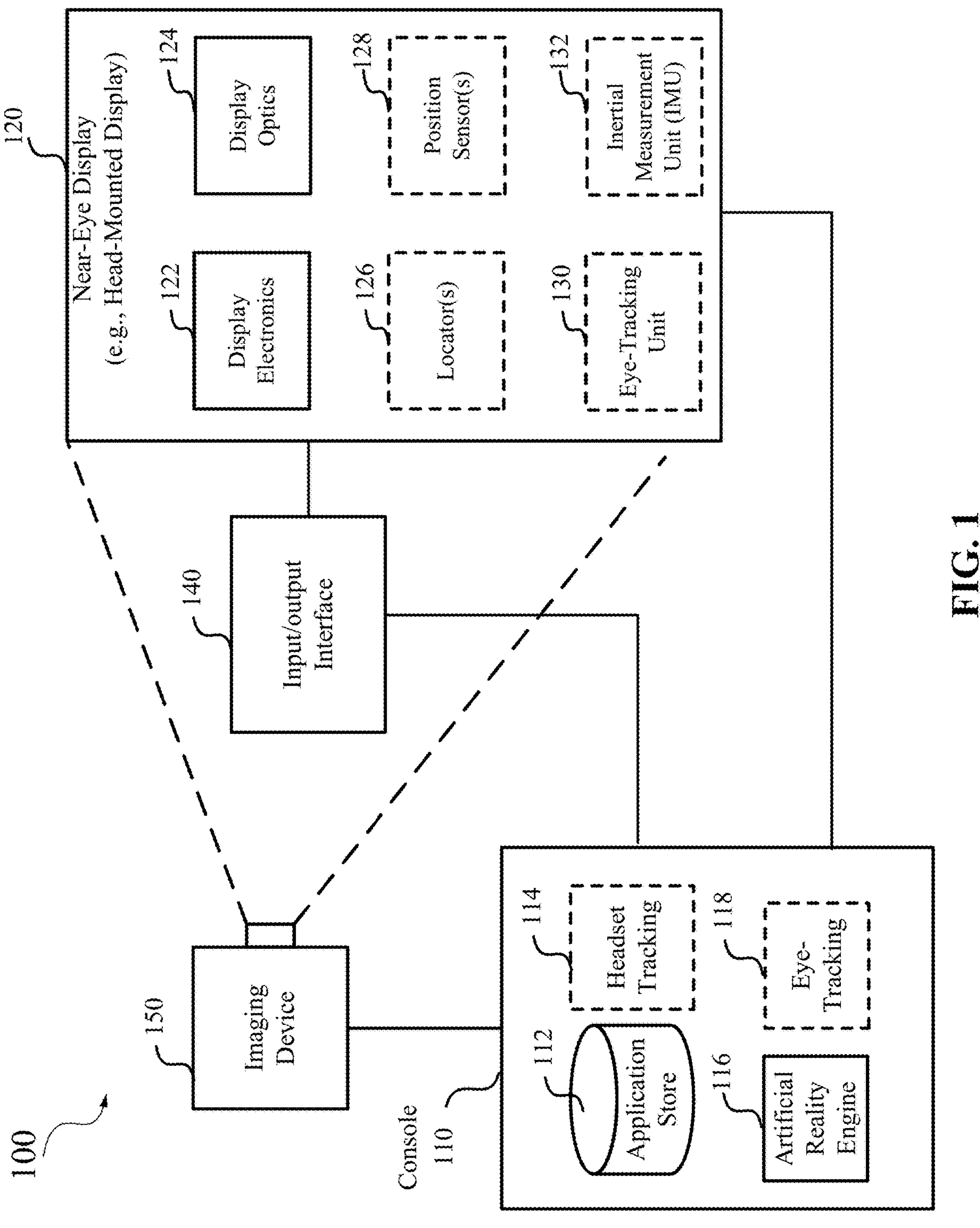
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to liquid crystal display (LCD). More specifically, and without limitation, techniques disclosed herein relate to reflective LCD panel-based near-eye display systems. Various inventive embodiments are described herein, including devices, systems, methods, structures, materials, processes, and the like.

In near-eye displays, the display panels or image sources may be implemented using, for example, liquid crystal display (LCD), organic light emitting diode (OLED) display, micro-OLED display, inorganic light emitting diode (ILED) display, quantum-dot light emitting diode (QLED) display, micro-light emitting diode (micro-LED) display, active-matrix OLED display (AMOLED), transparent OLED display (TOLED), and the like. It is generally desirable that the image source or the display panel of a near-eye display system has a higher resolution, a large color gamut, a large size, and better image quality, to improve the immersive experience of using the near-eye display system. For a battery-powered near-eye display system, it may also be desirable that the system has a higher power efficiency to improve the battery life of the system.

Many consumer virtual reality (VR) near-eye display systems use LCD panels to generate the displayed images. LCD panels for VR applications typically operate in a transmissive mode, where light may be modulated while being transmitted by the LCD panels. For example, a transmissive LCD panel may include a backlight unit (BLU) and a liquid crystal (LC) panel that may modulate and filter light from the BLU at individual pixels. The LC panel may include a liquid crystal cell sandwiched by a bottom (or back) substrate and a top (or front) substrate. In some implementations, the bottom substrate may include thin-film transistor (TFT) circuits formed on a glass substrate for controlling the liquid crystal cell, whereas the top substrate may include a common electrode and an array of color filters formed thereon. In some implementations, the bottom substrate may include both TFT circuits and an array of color filters formed on a glass substrate (referred to as color filter on array (COA)), whereas the top substrate may include a common electrode and a black matrix formed thereon. In some implementations, pixel electrodes and the common electrode may both be formed on the bottom substrate, for example, in fringe field switching (FFS) mode liquid crystal display, whereas the top substrate may include a black matrix and an overcoat layer formed thereon.

LCD panels may offer many advantages over other display technologies, such as lower cost, longer lifetime, higher energy efficiencies, larger sizes, and the like. However, transmissive LCD panels may have a resolution limit at about 2000 pixels per inch (ppi), even using the most advanced technologies. In addition, high-resolution LC panels (e.g., with a ppi greater than about 600 or higher such as 1400 or higher) may have low panel transmission and thus low power efficiency due to, for example, the reduced aperture ratio (e.g., the pixel active area over the pixel area) of each pixel.

According to certain embodiments disclosed herein, reflective mode LCD panels may be used with VR display optics in VR applications to improve the resolution, contrast, power efficiency, and other properties of the VR display systems. In a reflective mode LCD panel, the light source and the user's eyes may be on the same side of the LCD panel, and display light from the light source may be reflected to the user's eyes by the LCD panel. The active pixel area of a pixel may have a size of the reflector, which may be a large portion of or close to the total pixel area of the pixel. The reflectors in reflective mode LCD panels may include, for example, specular reflectors (e.g., metal reflectors that may also be used as pixel electrodes) or diffractive reflectors, and can have different orientations or diffraction angles at different locations, and thus may be configured to shape the reflected light beam such that the reflected light beam may be more efficiently collected by the display optics and projected to user's eyes. In some embodiments, the reflective mode LCD panels may have a curved shape, and may make it easier to design the display optics to reduce optical aberrations and achieve better image quality, such as higher dynamic range and contrast. In some embodiments, local dimming may be implemented in the reflective mode LCD panels by modulating the illumination light from the light source, to achieve better power efficiency and image contrast.

The reflective mode LCD panel-based VR displays disclosed herein may offer many advantages over VR displays implemented using other types of LCD panels, such as higher resolution, high power efficiency, better image quality, better control of beam shape/uniformity, lower weight and thickness, lower switching time, minimum eye strain, and the like. For example, in transmissive LCDs, pixel circuits, bus lines, and other opaque structures may compete for space with the transmissive area where light can pass through (the pixel active area). As the pixel density increases, the pixel circuits may take more and more space, leaving smaller and smaller active areas. In reflective LCDs, most areas for the pixel circuits may be used as the active pixel areas, and most (if not all) of the pixel area may be the active pixel area. Therefore, the pixel density and/or the active pixel area of each pixel can be increased. Reducing the pixel circuit area and increasing the active pixel area of each pixel may increase the power efficiency and the contrast of LCD panels, and reduce the "screen door effect." Reflective LCDs may also use thinner LC cells and thus may have shorter switching time. Since backlight units may not be needed in reflective LCD panels, reflective LCD panels may have lower weight and thickness. Other benefits may also be achieved as described in detail below.

The reflective LCD panels described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 12 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 120 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking subsystem 114, an artificial reality engine 116, and an eye-tracking subsystem 118. Some embodiments of console 110 may include different or additional devices or subsystems than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the devices or subsystems of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking subsystem 114 may track movements of near-eye display 120 using slow calibration information from external imaging device 150. For example, headset tracking subsystem 114 may determine positions of a reference point of near-eye display 120 using observed locators from the slow calibration information and a model of near-eye display 120. Headset tracking subsystem 114 may also determine positions of a reference point of near-eye display 120 using position information from the fast calibration information. Additionally, in some embodiments, headset tracking subsystem 114 may use portions of the fast calibration information, the slow calibration information, or any combination thereof, to predict a future location of near-eye display 120. Headset tracking subsystem 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking subsystem 114. Artificial reality engine 116 may also receive estimated eye position and orientation information from eye-tracking subsystem 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking subsystem 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking subsystem 118 to more accurately determine the eye's orientation.

Figure 2:
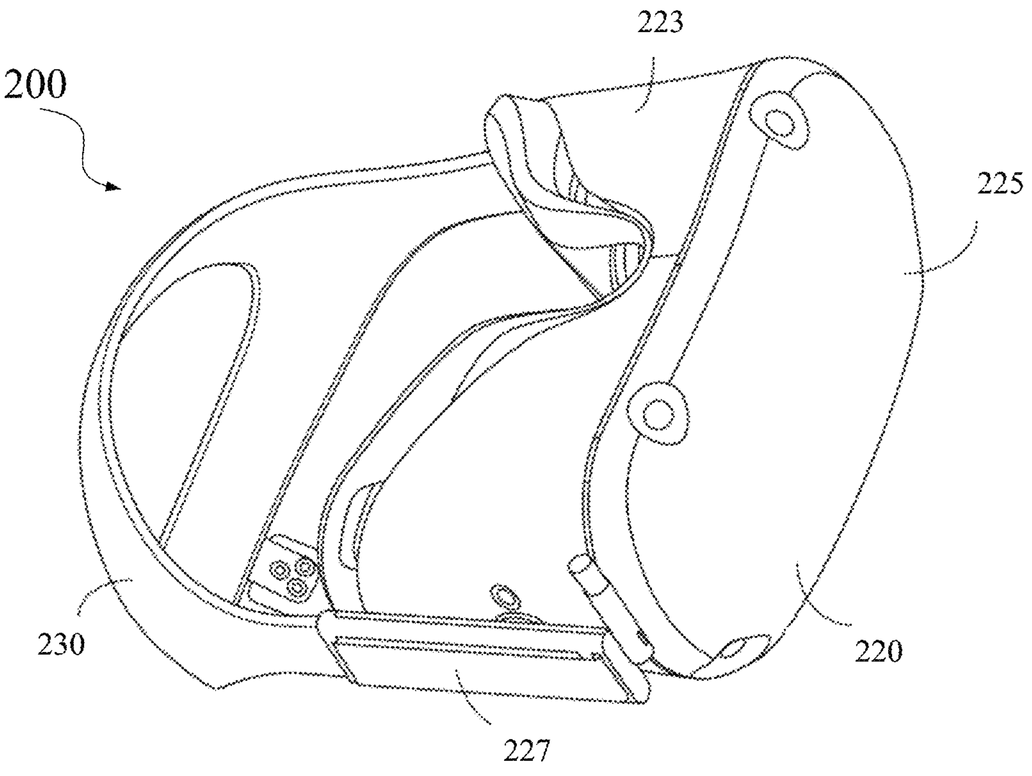
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
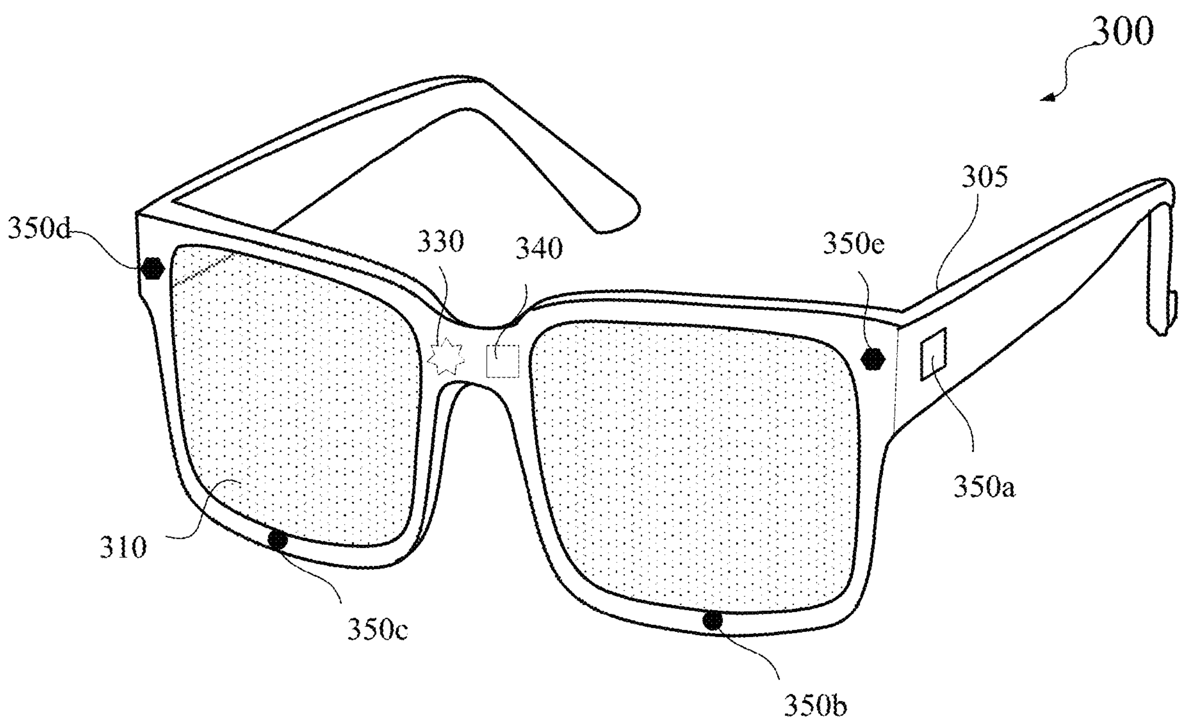
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD panel, an LED display panel, or an optical display panel (e.g., a waveguide display assembly).

Near-eye display 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display 300, and/or to provide an interactive VR/AR/MR experience to a user of near-eye display 300. In some embodiments, sensors 350*a*-350*e* may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350*a*-350*e* in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
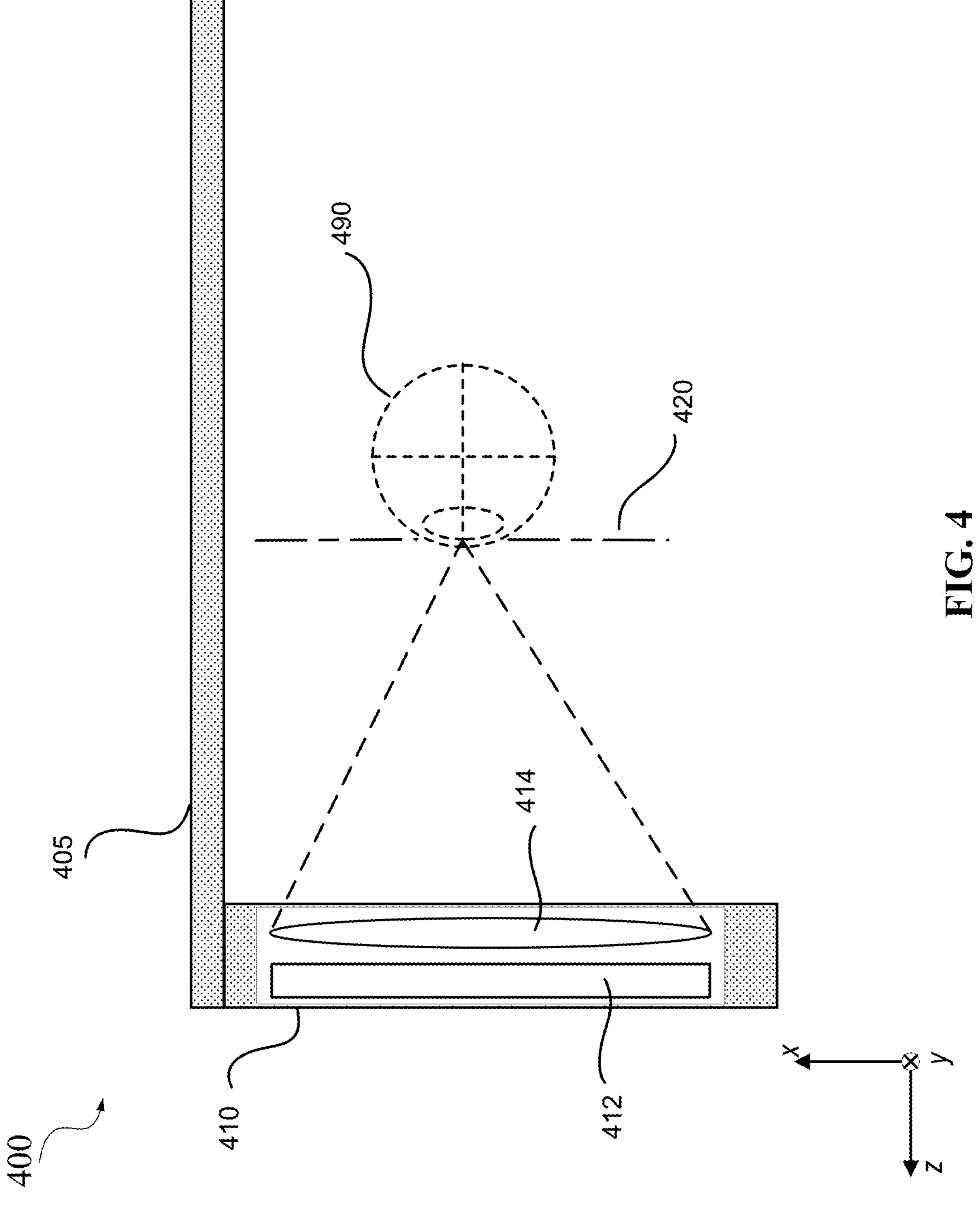
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 300, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal waveguide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include some forms of projection optics that magnify an image and relay it to the exit pupil.

Figure 5:
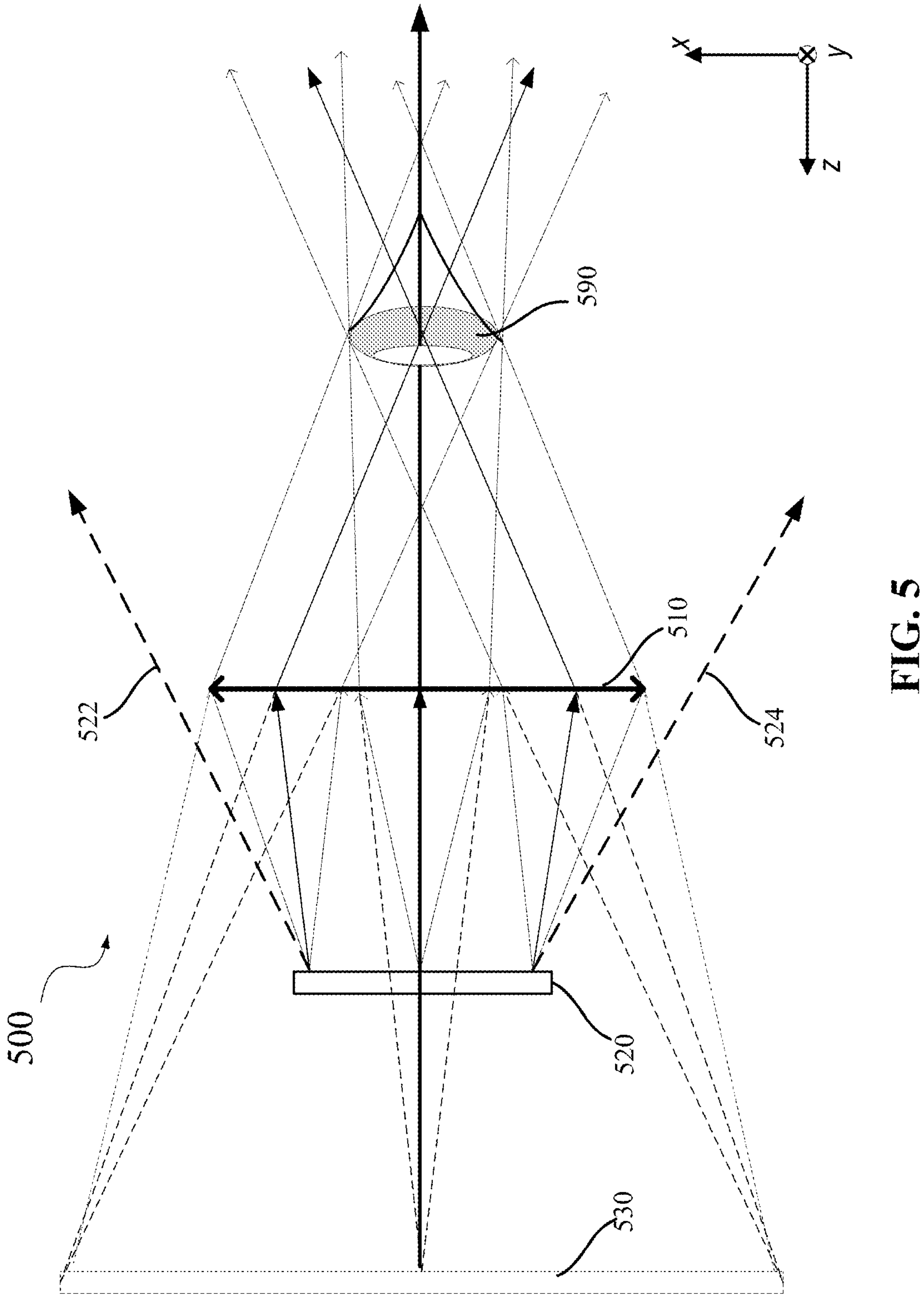
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may be an example of near-eye display 400, and may include display optics 510 and an image source 520 (e.g., a display panel). Display optics 510 may function as a magnifier. FIG. 5 shows that image source 520 is in front of display optics 510. In some other embodiments, image source 520 may be located outside of the field of view of the user's eye 590. For example, one or more deflectors or directional couplers may be used to deflect light from an image source to make the image source appear to be at the location of image source 520 shown in FIG. 5. Image source 520 may be an example of display 412 described above. For example, image source 520 may include a two-dimensional array of light emitters, such as semiconductor micro-LEDs or micro-OLEDs. The dimensions and pitches of the light emitters in image source 520 may be small. For example, each light emitter may have a diameter less than 2 μm (e.g., about 1.2 μm) and the pitch may be less than 2 μm (e.g., about 1.5 μm). As such, the number of light emitters in image source 520 can be equal to or greater than the number of pixels in a display image, such as 960×720, 1280×720, 1440×1080, 1920×1080, 2160×1080, 2560×1080, or even more pixels. Thus, a display image may be generated simultaneously by image source 520.

Light from an area (e.g., a pixel or a light emitter) of image source 520 may be directed to a user's eye 590 by display optics 510. Light directed by display optics 510 may form virtual images on an image plane 530. The location of image plane 530 may be determined based on the location of image source 520 and the focal length of display optics 510. A user's eye 590 may form a real image on the retina of user's eye 590 using light directed by display optics 510. In this way, objects at different spatial locations on image source 520 may appear to be objects on an image plane far away from user's eye 590 at different viewing angles. Image source 520 may have a size larger or smaller than the size (e.g., aperture) of display optics 510. Some light emitted from image source 520 with large emission angles (as shown by light rays 522 and 524) may not be collected and directed to user's eye 590 by display optics 510, and may become stray light.

The display panels or image sources described above (e.g., display 412 or image source 520) may be implemented using, for example, a liquid crystal display (LCD), an organic light emitting diode (OLED) display, a micro-OLED display, an inorganic light emitting diode (ILED) display, a micro-light emitting diode (micro-LED) display, an active-matrix OLED display (AMOLED), a transparent OLED display (TOLED), or some other displays. In a near-eye display system, it is generally desirable that the image source or the display panel has a higher resolution and a large size, such that the near-eye display system may have a large field of view (FOV) and better image quality to, for example, improve the immersive experience of using the near-eye display system. The FOV of a display system is the angular range over which an image may be projected in the near or far field. The FOV of a display system is generally measured in degrees, and the resolution over the FOV is generally measured in pixels per degree (PPD). The FOV of a display system may be linearly proportional to the size of the image source (e.g., the display panel), and may be inversely proportional to the focal length of the display optics (e.g., a collimation lens or lens assembly). A balance between the size of the image source and the optical power of the display optics may be needed in order to achieve a good modulation transfer function (MTF) and reduced size/weight/cost. The field of view may be increased by bringing the image source closer, but the image source would need to have higher PPD, and the aberrations of the display optics at the periphery may limit the effective field of view. To achieve a high PPD, micro displays with ultra-high pixels per inch (PPI) may be needed. There may be many technological challenges and cost issues associated with making high-PPI display panels, such as high resolution LCD panels.

Many consumer virtual reality (VR) near-eye display systems use LCD panels to generate the displayed images. LCD panels for VR applications typically operate in a transmissive mode, where light may be modulated while being transmitted by the LCD panels. For example, a transmissive LCD panel may include a backlight unit (BLU) and a liquid crystal (LC) panel that may modulate and filter light from the BLU at individual pixels. The LC panel may include a liquid crystal cell sandwiched by a bottom (or back) substrate and a top (or front) substrate. In some implementations, the bottom substrate may include thin-film transistor (TFT) circuits formed on a glass substrate for controlling the liquid crystal cell, whereas the top substrate may include a common electrode and an array of color filters formed thereon. In some implementations, the bottom substrate may include both TFT circuits and an array of color filters formed on a glass substrate (referred to as color filter on array (COA)), whereas the top substrate may include a common electrode and a black matrix formed thereon. In some implementations, pixel electrodes and the common electrode may both be formed on the bottom substrate, for example, in fringe field switching (FFS) mode liquid crystal display, whereas the top substrate may include a black matrix and an overcoat layer formed thereon.

Figure 6:
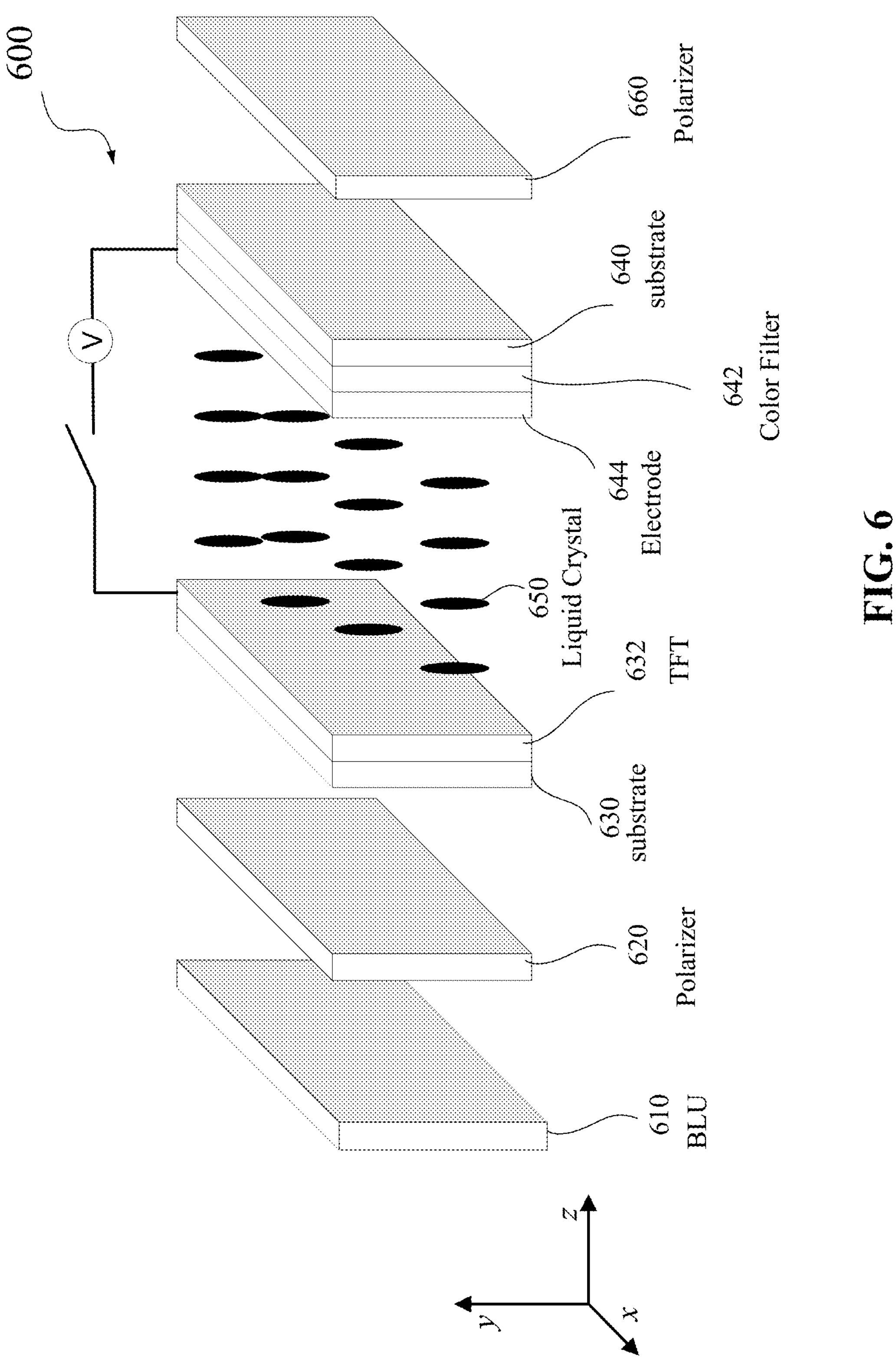
FIG. 6 illustrates an example of a liquid crystal display (LCD) panel.

FIG. 6 illustrates an example of an LCD panel 600. As illustrated, LCD panel 600 may include a backlight unit (BLU) 610 configured to emit illumination light, a first polarizer 620 configured to control the type of light that can pass through (e.g., based on the polarization state of the light), an LCD cell that may modulate (e.g., the phase or polarization state of) the incident light, and a second polarizer 660 for control the type of light that can pass through (e.g., based on the polarization state of the light). In some embodiments, BLU 610 may include a light source (e.g., a cold-cathode fluorescent lamp) configured to emit white light. In some embodiments, BLU 610 may include blue light-emitting LEDs, a light guide plate, and a quantum dot film that includes quantum dots for converting some blue light to red light and green light.

In the illustrated example, the LCD cell may include a first substrate 630 (e.g., a glass substrate or another transparent dielectric substrate) including a thin-film transistor (TFT) array 632 formed thereon. TFT array 632 may include an array of transistors for controlling the intensity of each pixel (e.g., by controlling the orientations of the liquid crystal molecules in a liquid crystal layer, thereby controlling the rotation angle of the polarization direction of the incident light). The LCD cell may also include a second substrate 640 with a common electrode 644 and a color filter (CF)/black-matrix (BM) array 642 formed thereon. One or more liquid crystal layers 650 may be sandwiched by first substrate 630 and second substrate 640.

In some other implementations, first substrate 630 may include both TFT array 632 and color filters formed on TFT array 632 to form a color filter on array (COA) structure, whereas the top substrate may include a common electrode and a black matrix formed on another glass substrate. The COA structure may enable a simplified process, improved aperture ratio, and reduced production cost. In some implementations, the LCD cell may be a fringe field switching (FFS) mode LCD cell, where the pixel electrodes and the common electrode may both be formed on the bottom substrate, and the top substrate may include a black matrix and an overcoat layer formed thereon.

Light emitted by BLU 610 (e.g., white light or blue light) may be polarized by first polarizer 620 (e.g., a linear polarizer with a polarizing axis in a first direction). The polarized light may pass through an array of apertures between the TFTs in TFT array 632. The polarized light may be modulated by the one or more liquid crystal layers 650 to change the polarization state (e.g., the polarization direction) according to the voltage signal applied to each region of the one or more liquid crystal layers 650. CF/BM array 642 may include red, green, and blue color filters, where each color filter may allow light of one color to pass through. Light passing through each color filter may become a subpixel of a color image pixel that may include three subpixels, and may be filtered by second polarizer 660 such that the change in the polarization state may be converted into a change in the light intensity or brightness. For example, second polarizer 660 may include a linear polarizer with a polarizing axis in a second direction that may be the same as or different from the first direction.

FIG. 7 illustrates an example of a layer stack of an LCD panel 700. LCD panel 700 may be an example of LCD panel 600. In the illustrated example, LCD panel 700 may include a BLU 710, a first polarizer 720, a first substrate 730 including a TFT array and/or black-mask 732 and an array of apertures 734 formed thereon, a common electrode layer 735, a second substrate 740 with a CF/BM array including a black-matrix layer 742 and optionally an array of color filters 744 in black-matrix layer 742, and a second polarizer 750. BLU 710 may be similar to BLU 610 described above. TFT array and/or black-mask 732 may include TFT circuits (e.g., TFTs, gate electrodes, source electrodes, etc.) for controlling liquid crystal molecules filled between first substrate 730 and second substrate 740. Common electrode layer 735 may include a transparent conductive oxide (TCO), such as indium tin oxide (ITO). Color filters 744 may include red, green, and blue color filters. Centers of color filters 744 may align with corresponding centers of apertures 734 on first substrate 730, such that light from BLU 710 and first polarizer 720 may pass through apertures 734 and color filters 744. Second polarizer 750 may include a linear polarizer with a polarizing axis in a direction that is different from or same as the direction of the polarizing axis of first polarizer 720. For example, the direction of the polarizing axis of first polarizer 720 may be orthogonal to the direction of the polarizing axis of second polarizer 750. First polarizer 720 and second polarizer 750 may be used in combination to convert the change in the polarization state (e.g., polarization direction) by the liquid crystal layer to change in the light intensity so as to display images to user's eyes.

As described above with respect to FIG. 6, in some implementations, instead of forming color filters 744 on a separate substrate, color filters 744 may be formed on first substrate 730 (e.g., between TFT array and/or black-mask 732) to form a COA structure. In some implementations, the LCD cell may be an FFS mode LCD cell, where both the pixel electrodes and the common electrode may be formed on first substrate 730 that includes the TFT array and/or black-mask 732. In other implementations, the TFT array, the color filters, the black matrix, and the electrodes may be arranged in other manners on the two substrates that sandwich the liquid crystal material.

Even though not shown in FIG. 7, spacers (e.g., plastic spacers) may be used between TFT array and/or black-mask 732 and common electrode layer 735 to separate TFT array and/or black-mask 732 and common electrode layer 735 so that liquid crystal materials may be filled between TFT array and/or black-mask 732 (or a protective or planarization layer 736) and common electrode layer 735 to modulate incident light. For example, TFT array and/or black-mask 732 may include column spacers formed thereon (e.g., on top of source electrodes), and the CF/BM array (or black-matrix layer 742 or common electrode layer 735) may include photo spacers formed thereon. When first substrate 730 and second substrate 740 are assembled to form an LCD cell, photo spacers may sit on corresponding column spacers to achieve the desired separation between TFT array and/or black-mask 732 and the CF/BM array (or black-matrix layer 742 or common electrode layer 735).

LCD panels may offer many advantages over other display technologies, such as lower cost, longer lifetime, higher energy efficiencies, larger sizes, and the like. However, transmissive LCD panels may have a resolution limit at about 2000 pixels per inch (ppi), even using the most advanced technologies. In addition, high-resolution LC panels (e.g., with a ppi greater than about 600 or higher such as 1400 or higher) may have low panel transmission and thus low power efficiency due to, for example, the reduced aperture ratio (e.g., the pixel active area over the pixel area) of each pixel.

Figures 8A, 8B:
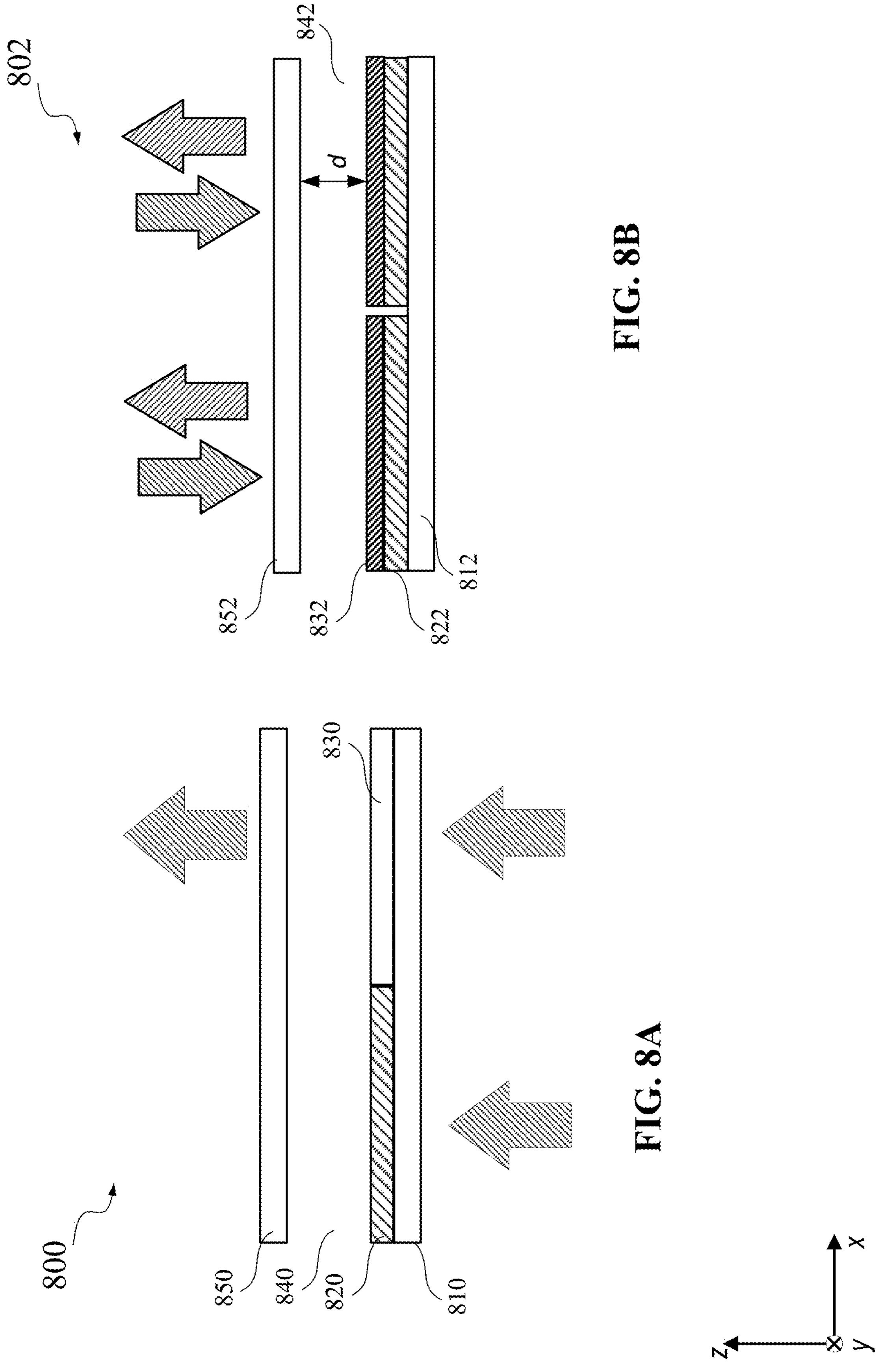
FIG. 8A illustrates an example of a pixel in a transmissive LCD.
FIG. 8B illustrates an example of a region of a reflective LCD.

FIG. 8A illustrates an example of a pixel in a transmissive LCD 800. As described above with respect to, for example, FIGS. 6 and 7, transmissive LCD 800 may include a first substrate 810 (e.g., a glass substrate), a second substrate 850 (e.g., a glass substrate), and a liquid crystal material layer 840 between first substrate 810 and second substrate 850. Electrodes may be formed on first substrate 810 and second substrate 850. Pixel circuits (e.g., TFTs), bus lines, black mask, and the like may be formed on first substrate 810, and may occupy an opaque area 820 in each pixel area where light may not pass through. Illumination light (from a backlight unit) may only pass through an active pixel area 830 that may be much smaller than the total pixel area. Therefore, in each pixel area, only a portion of the incident backlight may pass through. Because a large portion of the incident backlight may be blocked by opaque area 820, the energy efficiency of transmissive LCD 800 may be low. To have a sufficiently large active pixel area for each pixel to achieve the desired brightness, contrast, and other image quality, the pixel area may need to be large. Therefore, it may be difficult to achieve high pixel density or resolution in transmissive LCD 800.

According to certain embodiments disclosed herein, reflective mode LCD panels (also referred to as reflective LCD panels) may be used with VR display optics in VR applications to improve the resolution, contrast, power efficiency, and other properties of the VR display system. In a reflective mode LCD panel, reflectors (e.g., specular metal reflectors formed by metal electrodes or diffractive reflectors) and electrical circuits (e.g., transistors, electrodes, bus lines, etc.) may be formed on a substrate that is further away from the user's eye. The light source and the user's eye may be on the same side of the LCD panel, and the display light from the light source may be reflected by the reflectors to the user's eye. Therefore, the substrate including the reflectors and electrical circuits does not need to have an area that can allow visible light to pass through, and the active pixel area may have a size of the reflector, which may be a large portion of or close to the total pixel area of each pixel.

FIG. 8B illustrates an example of a region of a reflective LCD 802. Reflective LCD 802 may include a first substrate 812 (e.g., a transparent substrate or an opaque substrate), a second substrate 852 (e.g., a transparent substrate such as a glass substrate), and a liquid crystal material layer 842 between first substrate 812 and second substrate 852. Electrodes (e.g., a common electrode) may be formed on second substrate 852. Pixel circuits 822 (e.g., including TFTs and electrical interconnects for driving the pixels) may be formed on first substrate 812, and a reflector 832 may be formed on the pixel circuits for each pixel. In a traditional reflective LCD, the reflector on the backside may diffusely reflect incident light such that the reflected light may be viewed from large view angles on the front side. In reflective LCDs for VR applications disclosed herein, the reflectors may be specular reflector or other directional reflectors that may reflect incident light to certain desired directions.

In some embodiments, reflector 832 may be a metal reflector and may also be used as the pixel electrode for the pixel. Light from a light source on the side of second substrate 852 may be incident on second substrate 852, pass through liquid crystal material layer 842, reflected by reflector 832, pass through liquid crystal material layer 842 again, and then pass through second substrate 852 towards the user's eye. When reflectors 832 are used as the pixel electrodes, each individual reflector 832 may need to be isolated from adjacent reflectors 832, and thus the active pixel area may be slightly smaller than the pixel area in each pixel. When reflectors 832 are not used as the pixel electrodes, reflectors 832 for two or more pixels may form a contiguous reflective surface, and the active pixel area may be equal to the pixel area of each pixel. As such, the pixel area for each pixel of reflective LCD 802 can be much smaller than the pixel area for each pixel of transmissive LCD 800, and each pixel of reflective LCD 802 may still have a relatively large active pixel area to achieve the desired brightness, contrast, and other image quality. Therefore, the pixel density or resolution of reflective LCD 802 can be much higher than the pixel density or resolution of transmissive LCD 800.

For example, a transmissive LCD panel with a pixel density about 1700 ppi may be achieved using some advanced techniques such as subpixel rendering, color filter on array, low-temperature polycrystalline oxide (LTPO) backplanes, and the like, where the inactive (e.g., opaque) area including electrical circuits and black mask may be about 30% or more of the pixel area. When a reflective mode LCD panel is used to replace the transmissive mode LCD panel, the about 30% or more of the inactive area can be used as active pixel areas for additional pixels, thereby increasing the total number of pixels by about 40% or more, such that the pixel density can be greater than about 2000 ppi or higher.

As shown in FIG. 8B, in a reflective LCD panel, the active pixel area is not limited by the size of the pixel circuits and bus lines. This can significantly increase the active pixel area and the aperture ratio (the ratio between the active pixel area and total pixel area), and hence the contrast and the power efficiency of the reflective LCD panel. The higher aperture ratio may also improve the image quality in other ways. For example, because the inactive (dark) area is significantly reduced, minimized, or eliminated, "screen door effect" caused by the inactive areas between the active pixel areas may by significantly reduced.

As also shown in FIG. 8B, in a reflective LCD panel, incident light may pass through the liquid crystal material twice before reaching the user's eyes. Therefore, the thickness d of the liquid crystal cell in the reflective LCD panel can be a half of the thickness of the liquid crystal cell of a transmissive LCD. As such, the switching time t (both on and off time) of the liquid crystal cell in the reflective LCD panel may be a quarter of the switching time of the liquid crystal cell in the transmissive LCD panel for the same switching voltage V, because $\tau \propto 1/E^2$, where the electric field $E=V/d$. Reducing the switching time may improve the VR experience in several aspects, such as higher refresh rates (e.g., >90 Hz or higher), smaller persistence, and potential field sequential operation (by sequentially and periodically turning on and off red, green and blue light sources, rather than using color filters for the pixels), which may have an even bigger impact on the pixel density and resolution.

In addition, for reflective LCD panels, users' eyes may receive reflected light, which may be similar to the manner in which the users' eyes perceive real world objects. Therefore, reflective LCD panels may cause minimum strain or discomfort to the users' eyes and may improve user experience for VR applications.

Figure 9A:
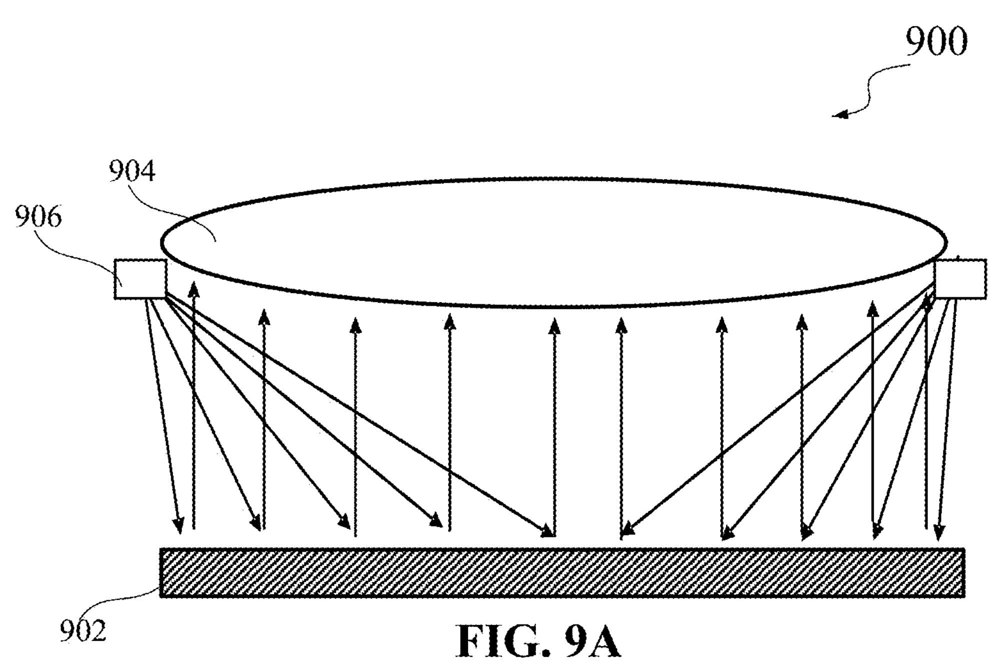
FIG. 9A illustrates an example of a near-eye display system including a reflective LCD panel according to certain embodiments.

FIG. 9A illustrates an example of a near-eye display system 900 including a reflective LCD panel 902 according to certain embodiments. In the illustrated example, near-eye display system 900 may include one or more light sources 906, reflective LCD panel 902, and display optics 904 (e.g., a lens such as a pancake lens). Light sources 906 may be in peripheral regions of reflective LCD panel 902 and may be used to illuminate reflective LCD panel 902 from the peripheral regions. In some other embodiments, a waveguide including output couplers (e.g., grating couplers or transflective mirrors) may be used between reflective LCD panel 902 and display optics 904 to project illumination light onto reflective LCD panel 902.

As also shown in FIG. 9A, no backlight unit (e.g., having a thickness about 1 mm or thicker) is used in reflective LCD panel 902. Light sources 906 may be front light sources that are on the same side of reflective LCD panel 902 as display optics 904. Therefore, the thickness and weight of reflective LCD panel 902 can be reduced.

Reflective LCD panel 902 may be an example of reflective LCD panel 802 shown in FIG. 8B, and may include reflectors formed on electrical circuits for addressing and driving individual pixels. The reflectors may reflect incident light from certain directions towards desired directions as described in more details below. In some embodiments, the reflectors may also be used as the pixel electrodes for driving individual pixels as described above.

Figure 9B:
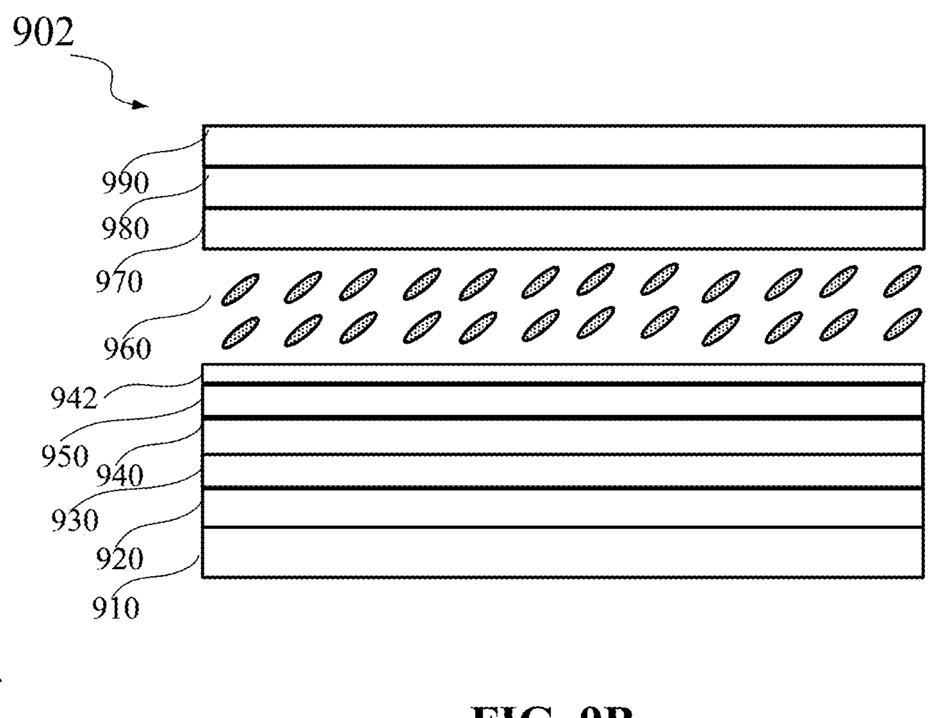
FIG. 9B illustrates a layer stack of an example of the reflective LCD panel of FIG. 9A.
Figure 9B:
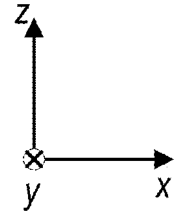

FIG. 9B illustrates a layer stack of an example of reflective LCD panel 902 of FIG. 9A. In the illustrated example, reflective LCD panel 902 may include a first substrate 910 (e.g., a glass substrate or a silicon substrate) that may be transparent or may not be transparent to visible light, and pixel circuits 920 (e.g., TFT circuits and/or CMOS circuits) formed on first substrate 910. A reflector layer 930, such as a metal layer that may also be used as a pixel electrode layer, may be formed on pixel circuits 920. In some embodiments, reflector layer 930 may include tilted reflectors. In some embodiments, an optional planarization layer 940 may be deposited on reflector layer 930 to form a smooth top surface. In some embodiments, a color filter layer 950 including a two-dimensional array of color filters may be formed on planarization layer 940. The two-dimensional array of color filters may include red, green, and blue filters as described above. In some embodiments, a planarization/encapsulation layer 942 may be formed on color filter layer 950 to form a flat surface and prevent color filter layer 950 from contaminating the liquid crystal material deposited thereon.

A liquid crystal material layer 960 may be formed on planarization/encapsulation layer 942 and color filter layer 950. As described above, liquid crystal material layer 960 may include liquid crystal molecules dispersed in a matrix structure (e.g., formed by polymers), where the orientations of the LC molecules may be rotated by the electric field applied to liquid crystal material layer 960 to modulate the light passing through liquid crystal material layer 960. A second substrate 970 may be on liquid crystal material layer 960 to sandwich liquid crystal material layer 960, together with the structure below liquid crystal material layer 960. A common electrode may be on second substrate 970. Optionally, a quarter waveplate 980 may be used on second substrate 970, for example, to convert circular polarized light into linear polarized light and/or convert linear polarized light into circular polarized light. A single linear polarizer 990 may be used to both filter incident light from the light source and reflected light from the LC cell.

As described above, the reflectors in reflective mode LCD panels may include, for example, specular reflectors or diffractive reflectors, such as metal reflectors, reflective gratings (e.g., volume Bragg gratings (VBGs), Pancharatnam-Berry phase (PBP) gratings, polarization volume holograms (PVHs), etc.), or meta-structures. The reflectors may offer additional design freedom for improving the performance of reflective mode LCDs. For example, for VR applications, it may be desirable that the light beam has uniform intensity within the lens acceptance cone (e.g., within about ±30°) and no light incident on the display optics is at angles outside the acceptance zone. With careful design of the front illumination light and pixel reflectors, reflective mode LCD panels may be able to generate light beams with beam profiles close to the desired beam profile. For example, in some embodiments, the reflectors in reflective mode LCD panels may have different orientations (e.g., diffraction tilt angles) at different locations, and thus may be able to shape the reflected light beam such that the reflected light beam can be more efficiently collected by the display optics and projected to user's eyes. In one example, the peak intensity direction of the light beam reflected by the reflector of a pixel at a certain field of view of the display optics may align with the corresponding chief ray angle of the pixel, which may be a function of the location of the pixel in the display panel, such that the light intensity may be uniform across the view angle range of the display panel. In another example, the reflectors may be oriented such that light incident on different reflectors from different respective angles may be reflected into similar directions (e.g., close to the surface-normal direction). In some embodiments, reflectors of the pixels may be on a concave surface, and thus may reflectively collimate or focus the incident light.

Figures 10A, 10B:
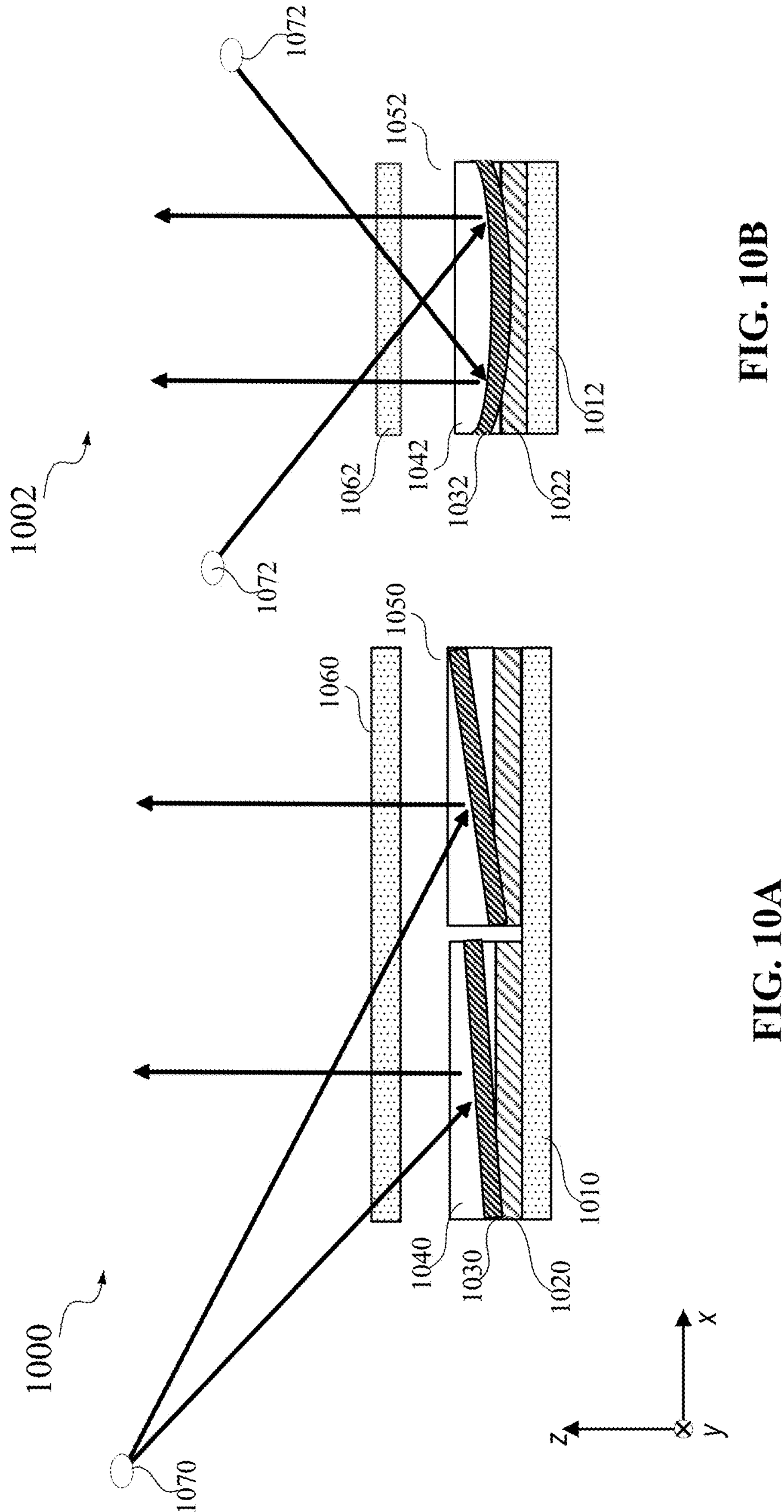
FIG. 10A illustrates an example of a reflective LCD panel in a near-eye display system according to certain embodiments.
FIG. 10B illustrates another example of a reflective LCD panel in a near-eye display system according to certain embodiments.

FIG. 10A illustrates an example of a reflective LCD panel in a near-eye display system 1000 according to certain embodiments. The reflective LCD panel may include a first substrate 1010 (e.g., a transparent substrate or an opaque substrate), a second substrate 1060 (e.g., a transparent substrate such as a glass substrate), and a liquid crystal material layer 1050 between first substrate 1010 and second substrate 1060. Electrodes (e.g., a common electrode) may be formed on second substrate 1060. As described above with respect to FIG. 9B, a polarizer (e.g., polarizer 990) and an optional quarter waveplate (e.g., quarter waveplate 980) may be used between second substrate 1060 and display optics (not shown in FIG. 10B).

Pixel circuits 1020 (e.g., including TFTs and electrical interconnects) may be formed on first substrate 1010, and reflectors 1030 may be formed on the pixel circuits. Visible light from light sources 1070 at peripheral regions of near-eye display system 1000 may be incident on reflectors 1030 in different regions from different directions. In some embodiments, reflectors 1030 may be metal reflectors and may be used as the pixel electrodes for the pixels. In some embodiments, reflectors 1030 may include diffractive reflectors, such as VBGs, PBP gratings, PVHs, or meta-structures. Reflectors 1030 may have different orientations (e.g., tilt angles) or different grating parameters in different regions, and thus may reflect incident light differently. In some embodiments, a planarization layer 1040 may be deposited on reflectors 1030 and may be planarized to have a flat top surface. A liquid crystal material layer 1050 may be sandwiched by planarization layer 1040 and second substrate 1060. Liquid crystal material layer 1050 may include LC molecules dispersed in a support matrix (e.g., formed by polymers).

As shown in FIG. 10A, light from light sources 1070 may be incident on second substrate 1060, pass through liquid crystal material layer 1050, reflected by reflectors 1030, pass through liquid crystal material layer 1050 again, and then pass through second substrate 1060 towards display optics and the user's eye. Since light sources 1070 are at peripheral regions of near-eye display system 1000, light from light sources 1070 may be incident on reflectors 1030 at different regions from different oblique angles. To direct the reflected light into similar directions (e.g., close to the normal direction) that are within the field of view of the display optics (e.g., within ±30°) towards display optics and the user's eye, reflectors at different regions may have different orientations as shown in FIG. 10A. In this way, the light intensity uniformity and the light collection efficiency of near-eye display system 1000 may be improved, and there may be less stray light that may otherwise degrade the image quality.

FIG. 10B illustrates another example of a reflective LCD panel in a near-eye display system 1002 according to certain embodiments. The reflective LCD panel in near-eye display system 1002 may include a first substrate 1012 (e.g., a transparent substrate or an opaque substrate), a second substrate 1062 (e.g., a transparent substrate such as a glass substrate), and a liquid crystal material layer 1052 between first substrate 1012 and second substrate 1062. Electrodes (e.g., a common electrode) may be formed on second substrate 1062. As described above with respect to FIG. 9B, a polarizer (e.g., linear polarizer 990) and an optional quarter waveplate (e.g., quarter waveplate 980) may be used between second substrate 1062 and display optics (not shown in FIG. 10B).

Pixel circuits 1022 (e.g., including TFTs and electrical interconnects) may be formed on first substrate 1012, and a concave-shaped reflector 1032 may be formed on the pixel circuits. Visible light from light sources 1072 at peripheral regions of near-eye display system 1002 may be incident on different regions of reflector 1032 from different directions. In some embodiments, reflector 1032 may be a metal reflector including multiple isolated sections that may be used as individual pixel electrodes for the pixels. A planarization layer 1042 may be deposited on reflector 1032 and may be planarized to form a flat top surface. A liquid crystal material layer 1052 may be sandwiched by planarization layer 1042 and second substrate 1062. Liquid crystal material layer 1052 may include LC molecules in a support matrix (e.g., formed by polymers).

As shown in FIG. 10B, light from light sources 1072 may be incident on second substrate 1062, pass through liquid crystal material layer 1052, reflected by reflector 1032, pass through liquid crystal material layer 1052 again, and then pass through second substrate 1062 towards display optics and the user's eye. Since light sources 1072 are at peripheral regions of near-eye display system 1002, light from light sources 1072 may be incident on different regions of reflector 1032 from different oblique angles. Reflector 1032 may have a concave shape and may collimate or concentrate the incident light, thereby redirecting the incident light into similar directions (e.g., close to the normal direction) that are within the field of view of the display optics (e.g., within ±30°) towards display optics and the user's eye. In this way, the light intensity uniformity and the light collection efficiency of near-eye display system 1002 may be improved, and there may be less stray light that may otherwise degrade the image quality.

It is noted that FIGS. 10A and 10B only show two examples of the design of the reflectors in reflective LCD panels. Other designs of the reflectors may also be used. For example, the reflectors may include planar diffractive reflectors, such as reflective VBGs or PVHs having different grating parameters at different regions and configured to diffract incident light from known incident angles towards desired directions. In another example, the reflectors may be implemented using meta-structures.

Existing reflective LCDs that use ambient light as the light sources may have low contrast. The ambient light may be weak in many circumstances, such as indoor conditions, and thus the brightness of the reflective LCDs may be very low. As a result, the displayed image may appear very dull. In addition, there may be strong Fresnel reflection at the front surface of the LCD panel, where the light reflected at the front surface may become background noise and may sometimes significantly degrade the contrast of the displayed image.

In reflective LCD-based near-eye display systems disclosed herein, the front illumination light from light sources can be more precisely controlled, and the light incident directions and the reflectors can be designed such that the light reflected at the front surface of the LCD panel may not be accepted by the display optics but the incident light may be reflected by the reflectors towards the display optics at angles within the acceptance cone of the display optics. As a result, the image contrast of reflective LCD-based near-eye display systems may not be impacted by the front surface reflection.

Figure 11:
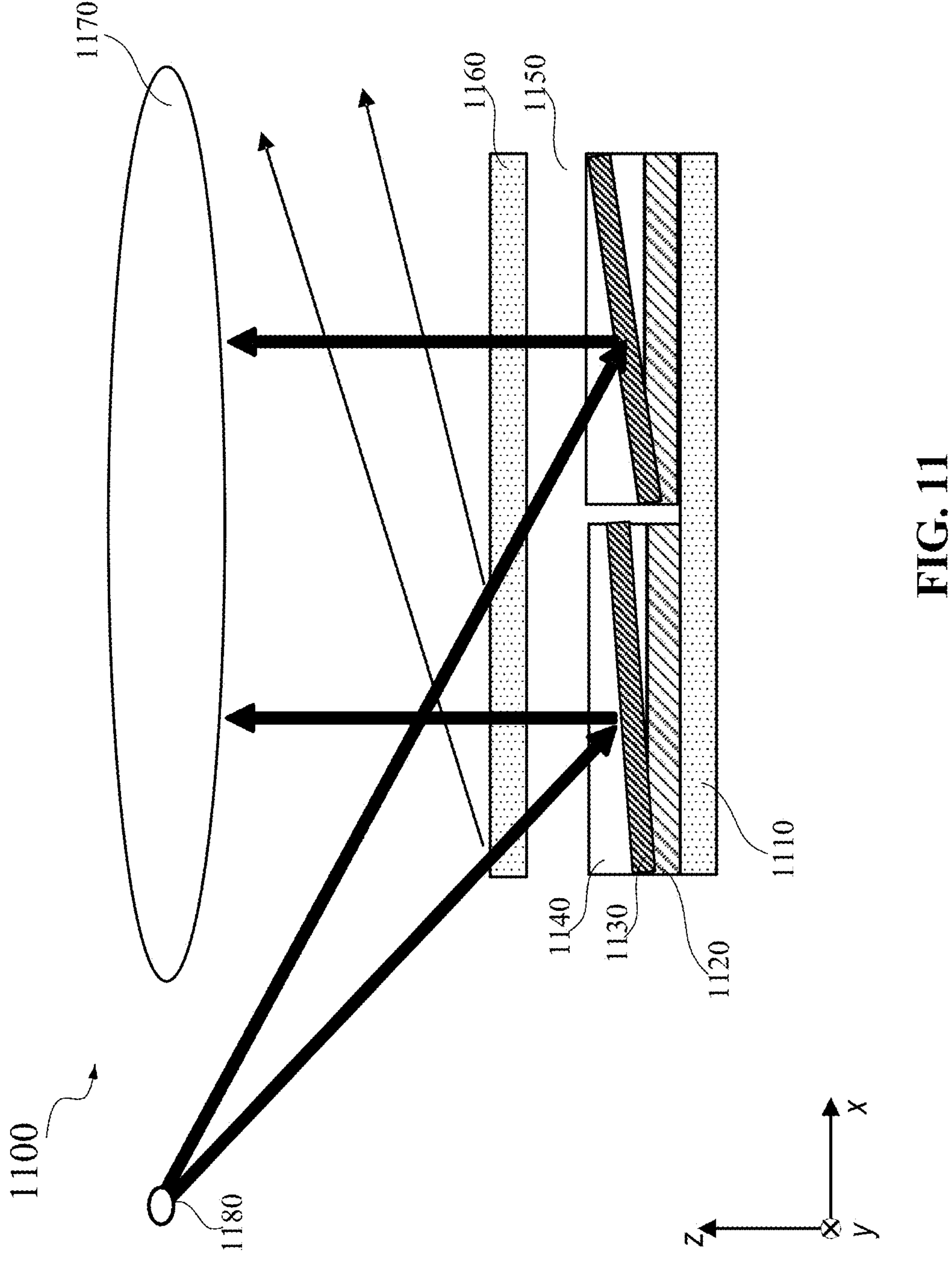
FIG. 11 illustrates an example of a reflective LCD panel-based near-eye display system according to certain embodiments.

FIG. 11 illustrates an example of a reflective LCD panel-based near-eye display system 1100 according to certain embodiments. The reflective LCD panel in near-eye display system 1100 may include a first substrate 1110 (e.g., a transparent substrate or an opaque substrate), a second substrate 1160 (e.g., a transparent substrate such as a glass substrate), and a liquid crystal material layer 1150 between first substrate 1110 and second substrate 1160. Electrodes (e.g., a common electrode) may be formed on second substrate 1160. As described above with respect to FIG. 9B, a polarizer (e.g., linear polarizer 990) and an optional quarter waveplate (e.g., quarter waveplate 980) may be used between second substrate 1160 and display optics 1170.

Pixel circuits 1120 may be formed on first substrate 1110, and reflectors 1130 may be formed on pixel circuits 1120. Visible light from light sources 1180 at peripheral regions of near-eye display system 1100 may be incident on reflectors 1130 in different regions from different directions. In some embodiments, reflectors 1130 may be metal reflectors and may be used as the pixel electrodes for the pixels. Reflectors 1130 may have different orientations in different regions. A planarization layer 1140 may be deposited on reflectors 1130 and may be planarized to form a flat top surface. In some embodiments, reflectors 1130 may include diffractive reflectors, such as VBGs or PVHs, or meta-structures. A liquid crystal material layer 1150 may be sandwiched by planarization layer 1140 and second substrate 1160. Liquid crystal material layer 1150 may include LC molecules in a support matrix (e.g., formed by polymers).

As shown in FIG. 11, light from light sources 1180 may be incident on second substrate 1160 at oblique angles, pass through liquid crystal material layer 1150, be reflected by reflector 1130, pass through liquid crystal material layer 1150 again, and then pass through second substrate 1160 towards display optics and the user's eye. Some light from light sources 1180 and incident on second substrate 1160 at oblique angles may be reflected at the top surface of second substrate 1160 (or a polarizer such as linear polarizer 990) due to Fresnel reflection. Light sources 1180 may be positioned and configured such that light from light sources 1180 may be incident on second substrate 1160 at large oblique angles and thus light specularly reflected by the top surface of second substrate 1160 may not be received or accepted by display optics 1170 and thus may not degrade the contrast of the displayed image.

In addition, reflectors 1130 may be designed (e.g., oriented) such that incident light in large oblique angles from light sources 1180 may be reflected by reflectors 1130 into approximately the normal direction towards display optics 1170. Since light sources 1180 are at peripheral regions of near-eye display system 1100, light from light sources 1170 may be incident on reflectors at different regions from different oblique angles. Reflectors at different regions may have different orientations as shown in FIG. 11 to reflect the incident light into similar directions (e.g., close to the normal direction) that are within the field of view of the display optics (e.g., within ±30°) towards display optics and the user's eye.

In some embodiments, local dimming may be implemented in the reflective LCD panels to achieve better power efficiency and image contrast. For example, in some embodiments, a stripe of LEDs may be used as the light sources (e.g., light sources 906, 1070, 1072, or 1180) to illuminate a reflective LCD panel. The LEDs may be individually turned on or off such that different regions of the display panel may be illuminated by light of different desired intensities, thereby achieving the effect of local dimming. In some embodiments, the light intensity at a region may be different at different time by turning on different LEDs. In another example, a lower resolution modulator (e.g., a spatial light modulator, a liquid crystal on silicon display, or a digital light processing display) may be positioned between the light source and the LCD panel to generate a desired light pattern for illuminating the LCD panel.

Display panels are often designed to have uniform viewing angle properties, where the light beam emitted by each region of a display panel may have, for example, a Gaussian beam profile with the peak luminance direction perpendicular to the display panel. However, the user's viewing angle (and the chief ray angle) for different regions of the display panel may vary across the display panel. For example, the chief ray for the center region of an LCD panel may be in the surface-normal direction of the LCD panel, but the chief ray for other regions of the LCD panel may be tilted at different angles with respect to the surface-normal direction of the LCD panel. The mismatch between the display peak luminance angle and the chief ray angle may lead to brightness variations depending on the user's gaze direction, which may be referred to as the brightness-roll-off (BRO) effect.

Figure 12A:
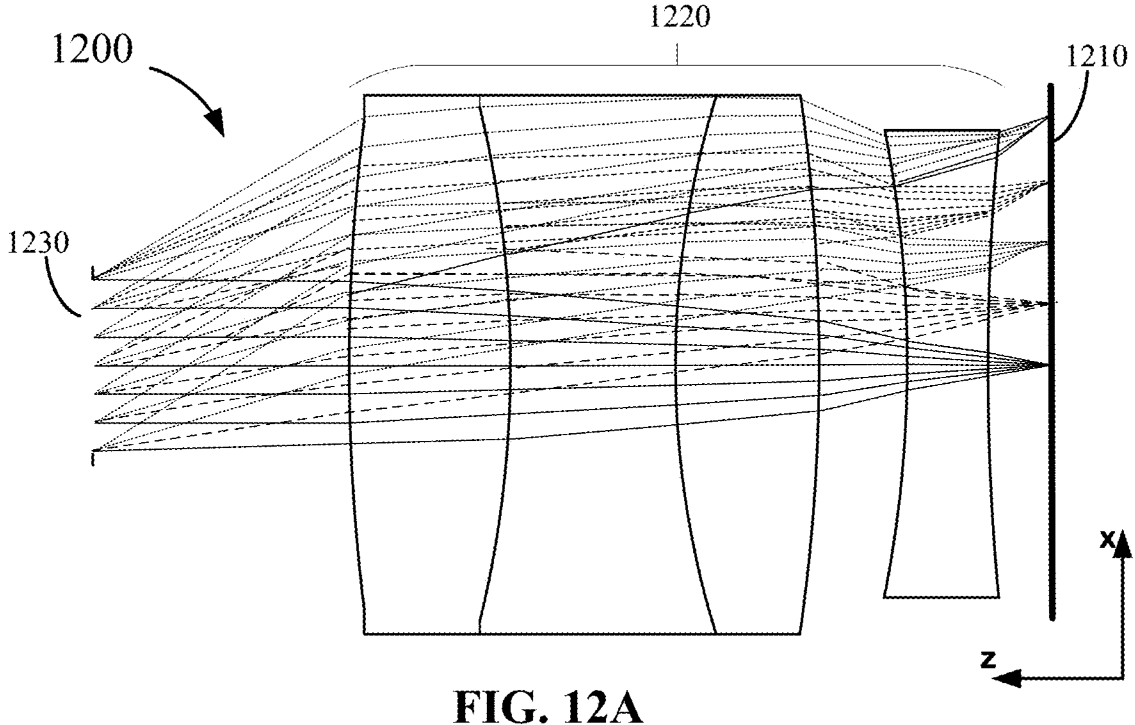
FIG. 12A illustrates an example of an LCD panel-based near-eye display system including an LCD panel and display optics.

FIG. 12A illustrates an example of an LCD panel-based near-eye display system 1200 including an LCD panel 1210 and display optics 1220. As illustrated in the example, due to the limited field of view (or acceptance angle) and/or the size of an exit pupil 1230 (or eyebox) of near-eye display system 1200, different angular portions of the light from respective pixels of LCD panel 1210 may pass through exit pupil 1230 of near-eye display system 1200. For example, the chief ray of the light beam from a pixel at the center of LCD panel 1210 that may reach the user's eyes may be incident on display optics 1220 at about 0°, while the chief ray of the light beam from a pixel at an edge of LCD panel 1210 that may reach the user's eyes may be incident on display optics 1220 at, for example, about 20°, which may be referred to as chief ray walk-off. When the light intensity of the light beam from each pixel is not uniform in all directions (such as having a narrow angular beam profile), light from different pixels may be projected to the user's eyes at different efficiencies due to the different angular portions of light from the respective pixels in LCD panel 1210 that can pass through exit pupil 1230.

Figure 12B:
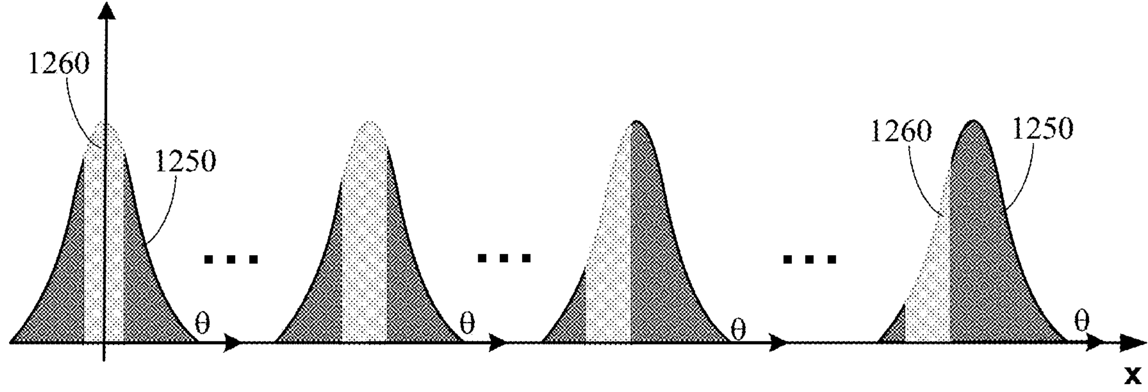
FIG. 12B illustrates examples of the portions of light beams emitted by the LCD panel of FIG. 12A that may be collected and projected to user's eyes by the display optics.

FIG. 12B illustrates examples of the portions of light beams emitted by LCD panel 1210 that may be collected and projected to user's eyes by display optics 1220. Due to the limited acceptance angles and/or the limited size of the exit pupil of display system 1200, only a portion of the light beam from each pixel may reach a user's eye through display optics 1220. In addition, due to the chief ray walk-off described above, the portion of each light beam that can reach the user's eyes may be within a different respective angular range for each respective pixel as shown in FIGS. 12A and 12B. The total power of each light beam may be indicated by the total area under a beam profile 1250 that represents the beam brightness profile of the light beam as a function of the view angle, while the total power of each light beam that may reach the user's eye may be indicated by the total area of a bright region 1260 under beam profile 1250, which may only be a fraction of the total area under beam profile 1250. For pixels at the center of LCD panel 1210, the area of bright region 1260 may be a large portion of the total area below beam profile 1250 because of the matching between the chief ray angle and the peak intensity direction, and thus the coupling efficiencies may be high for pixels at the center of LCD panel 1210. However, for pixels at the edges of LCD panel 1210, the area of bright region 1260 may only be a small portion of the total area below beam profile 1250 as shown in FIG. 12C, due to the mismatch between the chief ray angle and the peak intensity direction. In other words, the area of bright region 1260, and thus the coupling efficiency of a pixel in LCD panel 1210, may decrease significantly from the center to the edges of LCD panel 1210. Therefore, to improve the uniformity of the intensity or brightness of the displayed images, light emitted from pixels at the edges of LCD panel 1210 may need to be deflected differently than light emitted from pixels at the center of LCD panel 1210.

Figure 13:
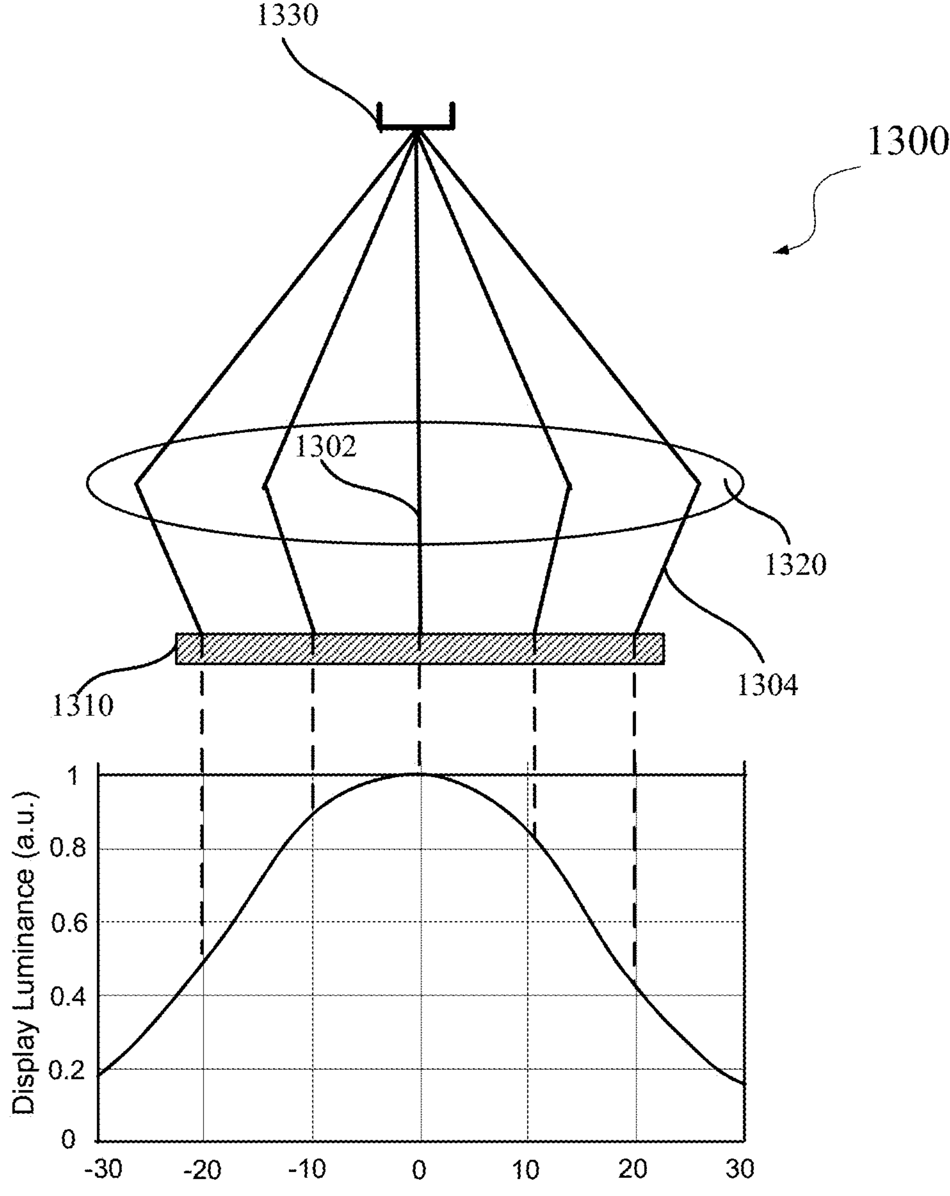
FIG. 13 illustrates a relationship between the display luminance and the view angle of a near-eye display that includes an LCD panel and display optics.

FIG. 13 illustrates a relationship between the display luminance and the view angle of a near-eye display 1300 that includes an LCD panel 1310 and display optics 1320. FIG. 13 also shows an exit pupil 1330 of near-eye display 1300, the chief ray 1302 for the center region of LCD panel 1310, and the chief ray 1304 for a peripheral region of LCD panel 1310. The direction of chief ray 1302 for the center region of LCD panel 1310 may match the peak luminance direction (e.g., the surface-normal direction) of LCD panel 1310, and thus the portion of the light emitted by the center region of LCD panel 1310 that reaches exit pupil 1330 of near-eye display 1300 may have a higher intensity. Therefore, the center region of LCD panel 1310 may appear to have a higher brightness to the user's eye. The direction of chief ray 1304 for the peripheral region of LCD panel 1310 may not match the peak luminance direction of LCD panel 1310, and thus the portion of the light emitted by the peripheral region of LCD panel 1310 that reaches exit pupil 1330 of near-eye display 1300 may have a lower intensity. Therefore, the peripheral region of LCD panel 1310 may appear to have a lower brightness to the user's eye.

In addition, display optics may generally have some optical aberrations, such as spherical aberrations, astigmatic aberrations, field curvature, and chromatic aberrations. For example, the image plane or focal plane of a lens system may be curved due to the curvature in the lens design, where the curvature of the image plane or focal plane may be referred to as Petzval field curvature. In a flat LCD panel-based near-eye display, it can be difficult to project the flat image to the user's eye by a lens system, without causing field curvature.

In some embodiments, the LC panel may be curved. In this way, the peak intensity direction (e.g., surface-normal direction) of the light beam emitted from a pixel at a certain field of view of the display optics may align with the corresponding chief ray angle of the pixel (which may be a function of the location of the pixel in the display panel), such that the light intensity may be uniform across the view angle range of the display panel. When the LCD panel is curved, the object plane and the source image may be curved, such that the image projected by the display optics to the user's eye may have minimum or no field curvature, even if the display optics can cause field curvature. The curved display panel may also make it easier to design the display optics to reduce other optical aberrations, and thus may improve the image quality, such as improving resolution, dynamic range, and contrast.

Figure 14:
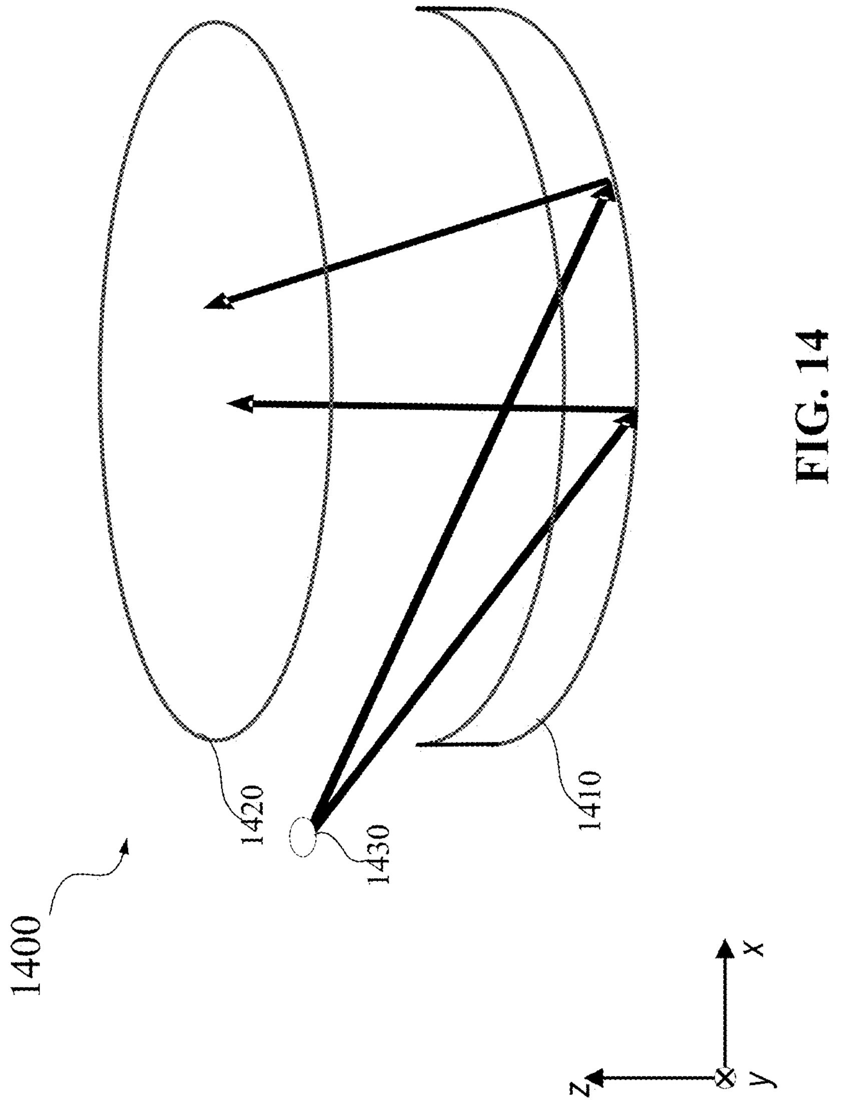
FIG. 14 illustrates an example of a curved reflective LCD panel-based near-eye display system according to certain embodiments.

FIG. 14 illustrates an example of a curved reflective LCD panel-based near-eye display system 1400 according to certain embodiments. In the illustrated example, near-eye display system 1400 may include a curved reflective LCD panel 1410, display optics 1420, and light sources 1430. In curved reflective LCD panel 1410, the two substrates that sandwich the LC material layer may be curved. Even though not shown in FIG. 14, curved reflective LCD panel 1410 may also include pixel circuits, reflectors (which may or may not be used as electrodes), a planarization layer on the reflectors to form a smooth top surface, color filters, one or more polarizers, and the like, as described above with respect to FIGS. 6-11.

Light sources 1430 may be at peripheral regions of near-eye display system 1400. Light from light sources 1430 may be incident on the reflectors at different regions of curved reflective LCD panel 1410 from different oblique angles. Reflectors at different regions may have different orientations to direct the reflected light into similar directions (e.g., close to the normal direction) that are within the field of view of the display optics (e.g., within ±30°) towards display optics 1420 and the user's eye. Since reflective LCD panel 1410 is curved, the display peak luminance angle (e.g., in surface-normal direction of the curved surface) and the chief ray angle of each pixel may be approximately the same, and thus there may be minimum or no brightness variations in different user gaze directions. In addition, different regions of curved reflective LCD panel 1410 may have similar distances to display optics 1420, and thus it may be much easier to design display optics 1420 to achieve low optical aberrations such as low Petzval field curvature, spherical aberrations, and other aberrations in near-eye display system 1400. Therefore, it may be easier to design display optics 1420 to achieve better image quality in near-eye display system 1400. It is noted that transmissive LCD panels may also be made to have a curved shape to achieve at least some of the benefits of the curved reflective LCD panels described above.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 15:
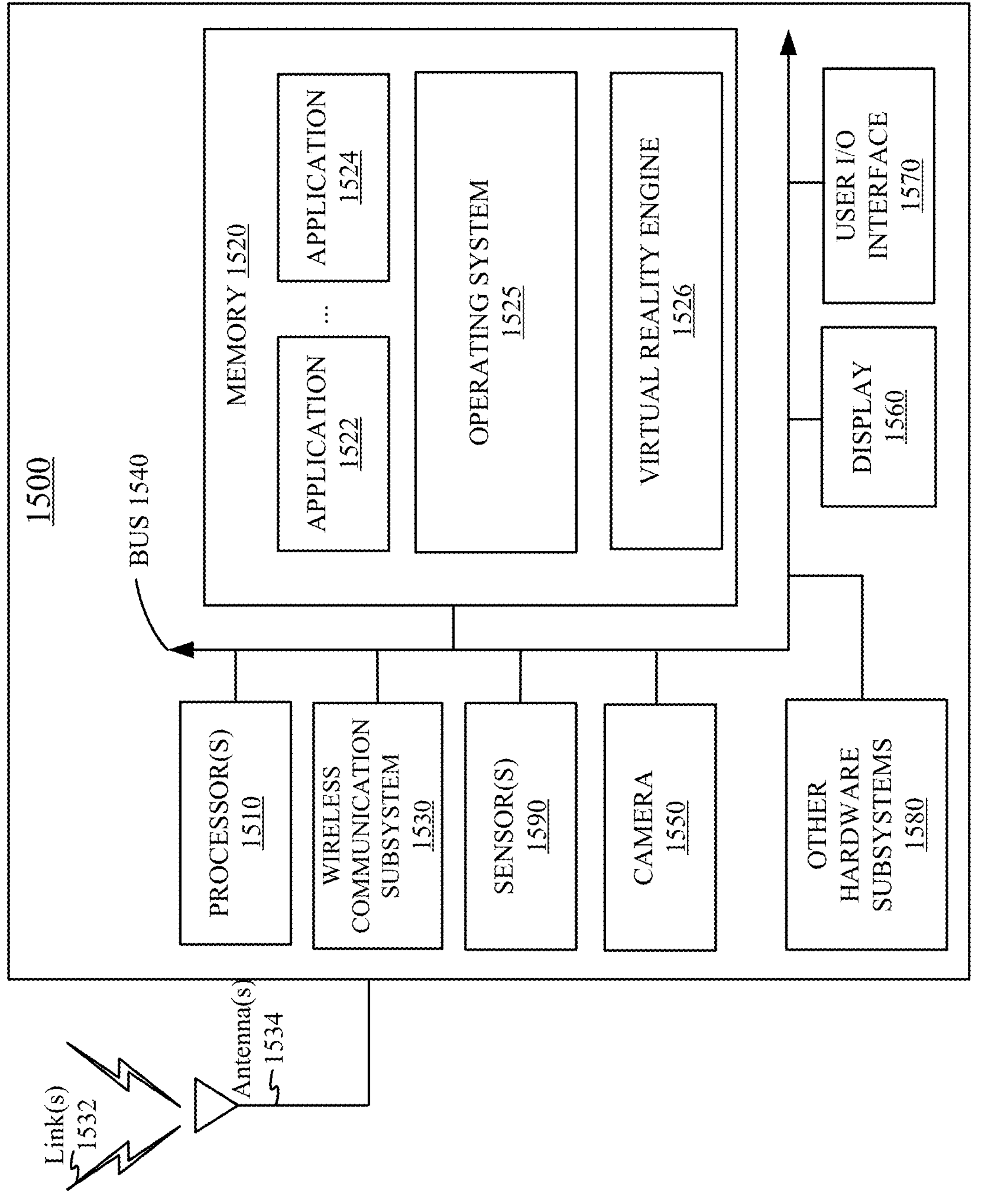
FIG. 15 is a simplified block diagram of an example of an electronic system of an example near-eye display (e.g., HMD device) for implementing some examples disclosed herein.

FIG. 15 is a simplified block diagram of an example of an electronic system 1500 of an example near-eye display (e.g., HMD device) for implementing some examples disclosed herein. Electronic system 1500 may be used as the electronic system of an HMD device or other near-eye displays described above. In this example, electronic system 1500 may include one or more processor(s) 1510 and a memory 1520. Processor(s) 1510 may be configured to execute instructions for performing operations at a number of components, and can be, for example, a general-purpose processor or microprocessor suitable for implementation within a portable electronic device. Processor(s) 1510 may be communicatively coupled with a plurality of components within electronic system 1500. To realize this communicative coupling, processor(s) 1510 may communicate with the other illustrated components across a bus 1540. Bus 1540 may be any subsystem adapted to transfer data within electronic system 1500. Bus 1540 may include a plurality of computer buses and additional circuitry to transfer data.

Memory 1520 may be coupled to processor(s) 1510. In some embodiments, memory 1520 may offer both short-term and long-term storage and may be divided into several units. Memory 1520 may be volatile, such as static random access memory (SRAM) and/or dynamic random access memory (DRAM) and/or non-volatile, such as read-only memory (ROM), flash memory, and the like. Furthermore, memory 1520 may include removable storage devices, such as secure digital (SD) cards. Memory 1520 may provide storage of computer-readable instructions, data structures, program code, and other data for electronic system 1500. In some embodiments, memory 1520 may be distributed into different hardware subsystems. A set of instructions and/or code might be stored on memory 1520. The instructions might take the form of executable code that may be executable by electronic system 1500, and/or might take the form of source and/or installable code, which, upon compilation and/or installation on electronic system 1500 (e.g., using any of a variety of generally available compilers, installation programs, compression/decompression utilities, etc.), may take the form of executable code.

In some embodiments, memory 1520 may store a plurality of applications 1522 through 1524, which may include any number of applications. Examples of applications may include gaming applications, conferencing applications, video playback applications, or other suitable applications. The applications may include a depth sensing function or eye tracking function. Applications 1522-1524 may include particular instructions to be executed by processor(s) 1510. In some embodiments, certain applications or parts of applications 1522-1524 may be executable by other hardware subsystems 1580. In certain embodiments, memory 1520 may additionally include secure memory, which may include additional security controls to prevent copying or other unauthorized access to secure information.

In some embodiments, memory 1520 may include an operating system 1525 loaded therein. Operating system 1525 may be operable to initiate the execution of the instructions provided by applications 1522-1524 and/or manage other hardware subsystems 1580 as well as interfaces with a wireless communication subsystem 1530 which may include one or more wireless transceivers. Operating system 1525 may be adapted to perform other operations across the components of electronic system 1500 including threading, resource management, data storage control and other similar functionality.

Wireless communication subsystem 1530 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1500 may include one or more antennas 1534 for wireless communication as part of wireless communication subsystem 1530 or as a separate component coupled to any portion of the system. Depending on desired functionality, wireless communication subsystem 1530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1530 may permit data to be exchanged with a network, other computer systems, and/or any other devices described herein. Wireless communication subsystem 1530 may include a means for transmitting or receiving data, such as identifiers of HMD devices, position data, a geographic map, a heat map, photos, or videos, using antenna(s) 1534 and wireless link(s) 1532.

Embodiments of electronic system 1500 may also include one or more sensors 1590. Sensor(s) 1590 may include, for example, an image sensor, an accelerometer, a pressure sensor, a temperature sensor, a proximity sensor, a magnetometer, a gyroscope, an inertial sensor (e.g., a subsystem that combines an accelerometer and a gyroscope), an ambient light sensor, or any other similar devices or subsystems operable to provide sensory output and/or receive sensory input, such as a depth sensor or a position sensor. For example, in some implementations, sensor(s) 1590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1500 may include a display 1560. Display 1560 may be a near-eye display, and may graphically present information, such as images, videos, and various instructions, from electronic system 1500 to a user. Such information may be derived from one or more applications 1522-1524, virtual reality engine 1526, one or more other hardware subsystems 1580, a combination thereof, or any other suitable means for resolving graphical content for the user (e.g., by operating system 1525). Display 1560 may use liquid crystal display (LCD) technology, light-emitting diode (LED) technology (including, for example, OLED, ILED, μLED, AMOLED, TOLED, etc.), light emitting polymer display (LPD) technology, or some other display technology.

Electronic system 1500 may include a user input/output interface 1570. User input/output interface 1570 may allow a user to send action requests to electronic system 1500. An action request may be a request to perform a particular action. For example, an action request may be to start or end an application or to perform a particular action within the application. User input/output interface 1570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1500. In some embodiments, user input/output interface 1570 may provide haptic feedback to the user in accordance with instructions received from electronic system 1500. For example, the haptic feedback may be provided when an action request is received or has been performed.

Electronic system 1500 may include a camera 1550 that may be used to take photos or videos of a user, for example, for tracking the user's eye position. Camera 1550 may also be used to take photos or videos of the environment, for example, for VR, AR, or MR applications. Camera 1550 may include, for example, a complementary metal-oxide-semiconductor (CMOS) image sensor with a few millions or tens of millions of pixels. In some implementations, camera 1550 may include two or more cameras that may be used to capture 3-D images.

In some embodiments, electronic system 1500 may include a plurality of other hardware subsystems 1580. Each of other hardware subsystems 1580 may be a physical subsystem within electronic system 1500. While each of other hardware subsystems 1580 may be permanently configured as a structure, some of other hardware subsystems 1580 may be temporarily configured to perform specific functions or temporarily activated. Examples of other hardware subsystems 1580 may include, for example, an audio output and/or input interface (e.g., a microphone or speaker), a near field communication (NFC) device, a rechargeable battery, a battery management system, a wired/wireless battery charging system, etc. In some embodiments, one or more functions of other hardware subsystems 1580 may be implemented in software.

In some embodiments, memory 1520 of electronic system 1500 may also store a virtual reality engine 1526. Virtual reality engine 1526 may execute applications within electronic system 1500 and receive position information, acceleration information, velocity information, predicted future positions, or some combination thereof of the HMD device from the various sensors. In some embodiments, the information received by virtual reality engine 1526 may be used for producing a signal (e.g., display instructions) to display 1560. For example, if the received information indicates that the user has looked to the left, virtual reality engine 1526 may generate content for the HMD device that mirrors the user's movement in a virtual environment. Additionally, virtual reality engine 1526 may perform an action within an application in response to an action request received from user input/output interface 1570 and provide feedback to the user. The provided feedback may be visual, audible, or haptic feedback. In some implementations, processor(s) 1510 may include one or more GPUs that may execute virtual reality engine 1526.

In various implementations, the above-described hardware and subsystems may be implemented on a single device or on multiple devices that can communicate with one another using wired or wireless connections. For example, in some implementations, some components or subsystems, such as GPUs, virtual reality engine 1526, and applications (e.g., tracking application), may be implemented on a console separate from the head-mounted display device. In some implementations, one console may be connected to or support more than one HMD.

In alternative configurations, different and/or additional components may be included in electronic system 1500. Similarly, functionality of one or more of the components can be distributed among the components in a manner different from the manner described above. For example, in some embodiments, electronic system 1500 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and" and "or," as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A near-eye display system comprising:

a reflective liquid crystal display (LCD) panel configured to generate a display image and having a portion of a reflective surface being concave-shaped;

display optics configure to project the display image to a user; and one or more light sources positioned on a same side of the reflective LCD panel as the display optics and configured to illuminate the reflective LCD panel to generate the display image.

2. The near-eye display system of claim 1, wherein the reflective LCD panel comprises:

a first substrate;

pixel drive circuits formed on the first substrate;

one or more reflectors on the pixel drive circuits;

a second substrate transparent to visible light; and a liquid crystal material layer between the second substrate and the one or more reflectors.

3. The near-eye display system of claim 2, wherein the one or more reflectors are configured to reflect incident light from the one or more light sources towards the display optics at angles within an acceptance cone of the display optics of the near-eye display system.

4. The near-eye display system of claim 2, wherein the one or more reflectors include specular metal reflectors, diffractive reflectors, or meta-structures.

5. The near-eye display system of claim 4, wherein the specular metal reflectors are used as pixel electrodes of pixels of the reflective LCD panel.

6. The near-eye display system of claim 2, wherein the one or more reflectors include a plurality of reflectors having different tilt angles with respect to the first substrate.

7. The near-eye display system of claim 6, wherein the plurality of reflectors are configured to reflect incident light from the one or more light sources towards the display optics at angles aligned with chief ray angles of pixels of the reflective LCD panel.

8. The near-eye display system of claim 6, wherein the reflective LCD panel further comprises a planarization layer on the one or more reflectors.

9. The near-eye display system of claim 2, further comprising a color filter layer between the one or more reflectors and the second substrate.

10. The near-eye display system of claim 2, wherein the first substrate and the second substrate are curved.

11. The near-eye display system of claim 2, wherein the one or more reflectors form a concave-shaped reflective surface configured to collimate or concentrate incident light.

12. The near-eye display system of claim 2, wherein the pixel drive circuits include thin-film transistors.

13. The near-eye display system of claim 2, wherein:

the first substrate includes a semiconductor substrate; and the pixel drive circuits include complementary metal-oxide-semiconductor (CMOS) circuits.

14. The near-eye display system of claim 1, wherein the one or more light sources are positioned at peripheral regions of the near-eye display system to illuminate the reflective LCD panel at oblique angles such that light reflected by a front surface of the reflective LCD panel is not collected and projected to the user by the display optics.

15. The near-eye display system of claim 1, wherein the one or more light sources include a plurality of light sources configured to be switched on or off to generate a light pattern for illuminating the reflective LCD panel.

16. The near-eye display system of claim 1, further comprising a light pattern generator between the one or more light sources and the reflective LCD panel, the light pattern generator configured to convert light from the one or more light sources into a light pattern for illuminating the reflective LCD panel.

17. The near-eye display system of claim 1, wherein the near-eye display system includes a virtual reality headset.

18. The near-eye display system of claim 1, wherein the reflective LCD panel is characterized by a resolution of 1700 or more pixels per inch.

19. The near-eye display system of claim 18, wherein the resolution of the reflective LCD panel is greater than 2000 pixels per inch.

20. The near-eye display system of claim 1, wherein a ratio between an active pixel area and a total pixel area of each pixel of pixels of the reflective LCD panel is greater than 80%.

* * * * *